(12) United States Patent
Khan et al.

(10) Patent No.: US 10,933,529 B2
(45) Date of Patent: Mar. 2, 2021

(54) COMPUTER-IMPLEMENTED METHODS AND SYSTEMS FOR GENERATING MATERIAL PROCESSING ROBOTIC TOOL PATHS

(71) Applicant: Hypertherm, inc., Hanover, NH (US)

(72) Inventors: Waseem Khan, Kirkland (CA); Mohammad Keshmiri, Longueuil (CA); Chahe Bakmazjian, Laval (CA); Liguo Huo, Laval (CA)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 16/909,512

(22) Filed: Jun. 23, 2020

(65) Prior Publication Data
US 2020/0316776 A1    Oct. 8, 2020

Related U.S. Application Data

(62) Division of application No. 16/031,981, filed on Jul. 10, 2018, now Pat. No. 10,723,025.

(Continued)

(51) Int. Cl.
*B25J 9/16*  (2006.01)
*B25J 9/04*  (2006.01)

(52) U.S. Cl.
CPC ............ *B25J 9/1666* (2013.01); *B25J 9/04* (2013.01); *B25J 9/1664* (2013.01); *B25J 9/1671* (2013.01);

(Continued)

(58) Field of Classification Search
CPC . B25J 9/1666; B25J 9/1664; B25J 9/04; B25J 9/1671; B25J 9/1697; G05B 2219/40519; G05B 2219/40477

(Continued)

(56) References Cited

U.S. PATENT DOCUMENTS

| | | |
|---|---|---|
| 5,530,791 A | 6/1996 | Okabayashi |
| 5,798,627 A | 8/1998 | Gilliland et al. |

(Continued)

FOREIGN PATENT DOCUMENTS

WO    2004067232 A2    8/2004

OTHER PUBLICATIONS

Anderson, et al, "Kinematic Inversion of Robotic Manipulators in the Presence of Redundancies", The International Journal of Robotics Research, 1989, vol. 8, No. 6, Dec. 1989, pp. 80-97.

(Continued)

*Primary Examiner* — Jaime Figueroa
(74) *Attorney, Agent, or Firm* — Proskauer Rose LLP

(57) ABSTRACT

In some aspects, computer-implemented methods for selecting a robotic tool path for a manufacturing processing system to execute a material processing sequence in three-dimensional space can include: providing to a computer-readable product including robotic system data of a robotic tool handling system and workpiece data relating to a processing path of a tool along the workpiece; generating a plurality of possible robotic tool paths to be performed to move the tool along the processing path; identifying one or more obstacles, or an absence of obstacles, associated with the robotic tool paths; comparing robotic tool paths based on a predetermined robotic parameter to be controlled as the tool moves from the start point to the end point; and based on the identified obstacles, determining feasible tool paths, between the start point and the end point that avoid the obstacles, that can be obtained by adjusting the predetermined robotic parameter.

24 Claims, 16 Drawing Sheets

Related U.S. Application Data

(60) Provisional application No. 62/530,666, filed on Jul. 10, 2017.

(52) U.S. Cl.
CPC ... *B25J 9/1697* (2013.01); *G05B 2219/40477* (2013.01); *G05B 2219/40519* (2013.01)

(58) Field of Classification Search
USPC .............................................. 700/245, 255
See application file for complete search history.

(56) References Cited

U.S. PATENT DOCUMENTS

| | | | |
|---|---|---|---|
| 5,920,678 A | 7/1999 | Watanabe et al. | |
| 6,157,155 A | 12/2000 | Kobayashi | |
| 8,036,465 B2* | 10/2011 | Khomo | G06K 9/224 |
| | | | 382/187 |
| 8,781,197 B2* | 7/2014 | Wang | G01R 33/54 |
| | | | 382/131 |
| 9,327,401 B2* | 5/2016 | Xiao | B25J 9/1643 |
| 9,776,325 B1* | 10/2017 | Hoffmann | B25J 9/1605 |
| 9,895,803 B1* | 2/2018 | Oslund | B25J 9/1666 |
| 9,958,862 B2* | 5/2018 | Kapoor | B25J 9/161 |
| 10,757,861 B2* | 9/2020 | Robertson | A01D 46/30 |
| 2003/0120391 A1 | 6/2003 | Saito | |
| 2005/0084153 A1* | 4/2005 | Khomo | G06K 9/224 |
| | | | 382/187 |
| 2006/0149421 A1 | 7/2006 | Akiyama et al. | |
| 2009/0326713 A1 | 12/2009 | Moriya | |
| 2010/0174410 A1 | 7/2010 | Greer et al. | |
| 2011/0035087 A1 | 2/2011 | Kim et al. | |
| 2011/0044524 A1* | 2/2011 | Wang | G01R 33/54 |
| | | | 382/131 |
| 2011/0153297 A1 | 6/2011 | Keibel | |
| 2012/0165982 A1 | 6/2012 | Kim et al. | |
| 2012/0215354 A1* | 8/2012 | Krasny | B25J 9/1666 |
| | | | 700/255 |
| 2013/0166061 A1 | 6/2013 | Yamamoto | |
| 2013/0310977 A1 | 11/2013 | Tsusaka et al. | |
| 2014/0039517 A1 | 2/2014 | Bowling et al. | |
| 2014/0249675 A1 | 9/2014 | Krishnasamy et al. | |
| 2014/0277719 A1 | 9/2014 | Kamiya et al. | |
| 2015/0100194 A1 | 4/2015 | Terada | |
| 2015/0209961 A1 | 7/2015 | Komatsu et al. | |
| 2015/0336269 A1* | 11/2015 | Linnell | B25J 9/1656 |
| | | | 700/245 |
| 2015/0343635 A1* | 12/2015 | Linnell | G06N 3/006 |
| | | | 700/249 |
| 2015/0374446 A1 | 12/2015 | Malackowski et al. | |
| 2016/0016311 A1 | 1/2016 | Konolige et al. | |
| 2016/0184987 A1 | 6/2016 | Masui et al. | |
| 2016/0257002 A1 | 9/2016 | Takayama | |
| 2016/0271799 A1 | 9/2016 | Sugio | |
| 2017/0181383 A1 | 6/2017 | Shen et al. | |
| 2017/0364076 A1 | 12/2017 | Keshmiri et al. | |
| 2018/0036882 A1 | 2/2018 | Kimura | |
| 2018/0129187 A1* | 5/2018 | Spieker | G05B 19/4061 |
| 2018/0214100 A1* | 8/2018 | Kumar | A61B 6/4458 |
| 2018/0283016 A1* | 10/2018 | Telleria | B24B 55/06 |
| 2018/0283019 A1* | 10/2018 | Telleria | B26D 5/007 |
| 2018/0361575 A1 | 12/2018 | Oumi | |
| 2019/0047145 A1 | 2/2019 | Akeel et al. | |
| 2019/0070732 A1 | 3/2019 | Chen et al. | |
| 2019/0261565 A1* | 8/2019 | Robertson | G06K 9/6257 |
| 2019/0314989 A1 | 10/2019 | Sokabe et al. | |
| 2020/0078097 A1* | 3/2020 | Gregerson | B25J 9/1666 |

OTHER PUBLICATIONS

Baron, "A Joint-limits Avoidance Strategy for Arc-Welding Robots", Montreal, Canada, pp. 1-8.

Geraerts R et al: "A Comparative Study of Probabilistic Roadmap Planners" In: "Springer tracts in advanced robotics", Jan. 1, 2004 (Jan. 1, 2004), Berlin; Heidelberg; New York: Springer, 2003-DE, XP055511086, ISSN: 1610-7438, vol. 7, pp. 43-57, DOI: 10.1007/978-3-540-45058-0_4.

Huo et al, "The Joint-limits and Singularity Avoidance in Robotic Welding", Industrial Robot: An International Journal, vol. 35, No. 5, Montreal, Canada, 2008, pp. 456-464.

Huo et al, "The Self-adaptation of Weights for Joint-limits and Singularity Avoidances of Functionally Redundant Robotic-task", Robotics and Computer-Integrated Manufacturing, vol. 27, Issue 2, Montreal, Canada, 2011, pp. 367-376.

Keshmiri M et al: Image-Based Visual Servoing Using an Optimized Trajectory Planning Technique, IEEE / ASME Transactions on Mechatronics., vol. 22, No. 1, Feb. 1, 2017 (Feb. 1, 2017), pp. 359-370, XP055511079, US ISSN: 1083-4435, DOI: 10.1109/TMECH.2016.2602325 Sections I, III and IV.

Yamamoto M et al: "Collision Free Minimum Time Trajectory Planning for Manipulators Using Global Search and Gradient Method", Intelligent Robots and Systems '94. 'Advanced Robotic Systems and the Real World', IROS '94. Proceedings of the IEEE/RSJ/GI International Conference on Munich, Germany Sep. 12-16, 1994, New York, NY, USA, IEEE, vol. 3, Sep. 12, 1994 (Sep. 12, 1994), pp. 2184-2191, XP010142009, ISBN: 0-7803-1933-8.

* cited by examiner

COMPUTER-IMPLEMENTED METHODS AND SYSTEMS FOR GENERATING MATERIAL PROCESSING ROBOTIC TOOL PATHS

RELATED APPLICATIONS

This application is a divisional of U.S. patent application Ser. No. 16/031,981, filed Jul. 10, 2018, and entitled "Computer-Implemented Methods and Systems for Generating Material Processing Robotic Took Paths," which claims priority to U.S. Provisional Patent Application Ser. No. 62/530,666, filed Jul. 10, 2017, entitled "Automatic Path Planning." The entire contents of these applications are incorporated herein by reference.

TECHNICAL FIELD

This application relates generally to material processing systems, and more specifically to computer-implemented methods and systems for generating material processing robotic tool paths.

BACKGROUND

Performing material processing sequences using robotic tool handling systems has become a common trend in manufacturing industries. Such manufacturing techniques can offer economical solutions for medium to low accuracy machining applications. However, due to the complexity of the robot kinematics for some robotic tool handling systems, planning for robotic tool paths can be challenging. Semi-graphical or semi-automatic approaches to tool planning have been developed that can be used to program large robot-paths. Such approaches have been generally well received by the industry and have been proven to be robust in practice. However, such approaches often have to be implemented in combination with user input.

SUMMARY

In some aspects, a computer-implemented method for selecting a robotic tool path for a manufacturing processing system to execute a material processing sequence in three-dimensional space can include: providing to a computer a computer-readable product including robotic system data associated with physical parameters of a robotic tool handling system and workpiece data for a workpiece to be processed by the material processing system, the workpiece data relating to a processing path of a tool connected to the robotic tool handling system along the workpiece; generating a start point and an end point of the processing path; generating a plurality of possible robotic tool paths to be performed to move the tool along the processing path between the start point and the end point; based on the robotic system data and/or the workpiece data, identifying one or more obstacles, or an absence of obstacles, associated with the robotic tool paths; comparing robotic tool paths based on a predetermined robotic parameter to be controlled as the tool moves from the start point to the end point; and based on the identified obstacles, determining feasible tool paths, between the start point and the end point that avoid the obstacles, that can be obtained by adjusting the predetermined robotic parameter.

Embodiments can include one or more of the following features.

The method can further include identifying a preferred robotic tool path to move the tool along the processing path based on avoiding the set of identified obstacles. The identifying the preferred robotic tool path can include selecting one or more boundary points for the preferred robotic tool path around one or more obstacles.

The method can further include progressively analyzing a set of channels formed between the start point and end point to identify an optimal homotopic tool path between the start point and the end point that avoids the set of obstacles The progressively analyzing can include progressing substantially linearly from the start point toward the end point; identifying a first path point in an opposite axis of travel upon linear impact with an obstacle, the first path point being linearly clear of the obstacle; charting a first portion of the robotic tool path directly between the start point and the first path point; and progressing toward the end point.

The method can further include generating a set of channels between the start point and end point about the set of obstacles, the channels indicating the feasible homotopic tool paths. Each channel of the set of channels can include a series of distinct columns comprising a plurality of distinct pixels. The identifying one or more obstacles can include progressively analyzing the set of channels to identifying a centerpoint of each column and generating a tool path that travels through the centerpoint of each column. The method can further include progressively analyzing the set of channels by grading each pixel in the set of columns. The grading can be performed starting with an end column of the set of channels and progresses toward the start point through each column.

The method can further include performing the material processing sequence. The predetermined robotic parameter can include a rotational angle of the tool about its longitudinal axis. The obstacles can include physical obstacles and/or virtual obstacles including limitations of the robotic tool handling system. The virtual obstacles can include joint limitations, singularities, and robotic limitations. The physical obstacles can include physical obstructions in or around the workpiece. The identifying one or more obstacles can include solving robotic inverse kinematic and collision detection for all possible tool poses along a user set range along the plurality of possible robotic paths with a predetermined resolution for each path point along the processing path. The robotic tool paths can include positions and orientations of robotic components as the tool is moved along the processing path. The physical parameters can include dimensions or physical capabilities of the robotic tool handling system. Physical parameters can include robotic arm link lengths, offset lengths, offset angles between joints, and/or joint motion ranges of one or more joints. The robotic system data can include robotic manufacturer information. The workpiece data further can include a shape of a workpiece to be processed.

In some aspects, a computer-implemented method for determining a preferred robotic path configuration for performing a robotic processing operation along a workpiece can include: providing a two-dimensional representation of a plurality of possible three-dimensional robotic tool paths to be performed to move a tool connected to a robotic tool handling system along the workpiece along a processing path, the two-dimensional representation identifying, based on robotic system data and/or workpiece data, one or more obstacles associated with the robotic tool paths; based on the identified obstacles, generating a set of channels about the set of obstacles to indicate feasible homotopic tool paths that avoid the obstacles; and based on the channels, determining one or more acceptable robotic path configurations for performing a robotic processing operation along the processing path on the workpiece.

Embodiments can include one or more of the following features.

The channels can include one or more adjacent separate regions of the two-dimensional representation. The regions can include columns arranged side-by-side between a first point index and a last point index. Each separate region can be formed along incremental distances between the start point and end point that are substantially consistent for each channel. The first point index can include a start point and the last point index can include an end point. A number of regions in the set of regions can correspond to a number of obstacles identified. The separate regions can be formed around identified obstacles. For a given channel, regions can be bound along upper and/or lower ends by obstacles. The determining one or more acceptable robotic path configurations can include analyzing each region to determine an acceptable path through each channel and linking the determined acceptable paths through each adjacent region to form an acceptable robotic path configuration. The linking can include forming a path through midpoints of each region. The method can further include, for each of the one or more acceptable robotic path configurations, calculating a distance between midpoints of adjacent regions. The method can further include selecting one of the one or more acceptable robotic path configurations to be used to perform the robotic processing operation along the workpiece based on an accumulated calculated distance between midpoints of adjacent regions for each path. The selection can be based on the path having the least accumulated distance. The method can further include selecting one of the one or more acceptable robotic path configurations to be used to perform the robotic processing operation along the workpiece based on performance parameters of a component of the robotic tool handling system. The performance parameters can include limitations on or more robotic joints.

The determining one or more acceptable robotic path configurations can include receiving one or more user-selected points along the two-dimensional representation and forming a robotic path configuration that passes through the user-selected points by analyzing each remaining region to determine an acceptable path through each region and linking the determined acceptable paths through each adjacent region.

The determining one or more acceptable robotic path configurations can include presenting the two-dimensional representation to a user and receiving a user's instructions for a desired robotic path configuration.

In some aspects, a computer-implemented method for determining a robotic tool path for a manufacturing processing system in three dimensional space can include: receiving robotic system data associated with physical parameters of a robotic tool handling system; receiving workpiece data for a workpiece to be processed by the material processing system, the workpiece data relating to a processing path of a tool connected to the robotic tool handling system along the workpiece during a material processing operation; based on the robotic system data, calculating a plurality of potential robotic tool paths configured to move the tool along the processing path; identifying obstacles along the robotic tool paths; presenting to a user a two-dimensional representation of the potential robotic tool paths as a function of a predetermined robotic parameter to be adjusted during the operation; and based on the identified obstacles, determining feasible robotic tool paths between the start point and the end point that avoid the obstacles.

Embodiments can include one or more of the following features.

The calculating a plurality of potential robotic tool paths can include evaluating, at a series of points along the processing path, a possible range of motion and orientation of the robotic tool handling system to place the tool in an intended position at each of the series of points. The evaluating a possible range of motion and orientation can include determining changes in motion and orientation of the robotic tool handling system based on a range of values of the predetermined robotic parameter. The predetermined robotic parameter can include an angular position of the tool about its longitudinal axis. The presenting to the user the two-dimensional representation can include presenting a series of adjacent columns, each column corresponding to each of the series of points along the processing path. The identifying the obstacles along the robotic tool paths can include determining values of the predetermined robotic parameter at which, based on the robotic system data, the robotic tool handling system is not suitable to provide the tool to the intended position at each of the series of points. The method can further include providing a visual indication along each column in regions of the two-dimensional representation at which the robotic tool handling system is not suitable to provide the tool to the intended position.

Embodiments described herein can have one or more of the following advantages.

In material processing applications (e.g., machining, cutting, marking, etc.), a tool path is typically a 5 degrees-of-freedom (DOF) entity composed of a tool position and a vector of tool orientation. Many industrial robotic systems, on the other hand, have six or more degrees-of-freedom, which provide additional degrees of freedom (e.g., a rotation of the tool about its longitudinal axis) to be manipulated. For this reason, when a typical six degrees-of-freedom industrial robot is employed in a processing operation, the extra, sixth degree of freedom (e.g., rotation of the tool about the tool's longitudinal (e.g., symmetric) axis) should be accounted for. This additional degree of freedom can be beneficial in the sense that it can be used to avoid one or more obstacles (e.g., robot singularities, joint limits, collisions, etc.) during use. The kinematics of the robot itself bring in certain challenges to path planning for articulated robots. These challenges can include multiple robot configurations, non-trivial workspace boundaries, and robot singularity zones. The challenges can be further complicated by the introduction of joint limits, multi-turn joints, and collision constraints. Many of these issues can be reduced (or eliminated) by exploiting and planning the available sixth degree of freedom (e.g., by selectively rotating the tool about its symmetric axis) appropriately. Thus, the systems and methods described herein can be implemented to develop an automatic path planning framework for articulated robots in many applications. In addition to addressing the challenges discussed above, the systems and methods described herein can be used to provide for a high probability of path success and the ability of manual fine-tuning of the planned path. For example, the systems and methods described herein are typically able to provide information, with improved confidence levels, regarding whether or not a feasible robot path exists for a desired (e.g., predetermined) tool path.

Conventional approaches to address these challenges have been based on classical local optimization techniques. In some approaches, the rotation of the tool about its symmetrical axis can be resolved through optimization of a suitable set of local criteria. Typically, these approaches are not robust enough due to the fact that following a local minimum at one point can actually lead the robot to singularities, joint limits, etc., later in the process. Whereas, the systems and methods described herein can obtain a full view of all obstacles along a processing path and can determine a desired (optimal robotic path) accordingly by factoring late path considerations into early path decisions.

Other approaches, a graphical-method which can identify robot path issues and map these issues into a two-dimensional representation, were developed. The two-dimensional representation, referred to as a map, an optimization graph or OptimGUI (Optimization Graphical User Interface), visualizes all the possible obstacles along a tool path, such as singularities, joint limits, workspace limits, collision and joints over travel. This is done through sampling all possible cases with a constant sequence. This allows a user to visually plan a path far from the obstacles. However, such planning could be tedious for long operations and is inefficient as it significantly increases the processing time for a given operation.

In some aspects, the systems and methods described herein can be used to automate the processing path planning procedure. In some embodiments, formation and analysis of channels along the two-dimensional representation can be used to provide and analyze most (or all) of the possible solutions for the robotic system processing paths. The channels can be sorted and a path can be introduced in each channel. The paths through each channel can depend on a variety of criteria, such as an adjustment of the robotic system's sixth degree of freedom (e.g., the rotational angle of the tool). For example, in some cases, this path can be chosen to reduce (minimize) the tool's rotation about the z-axis (e.g., longitudinal axis) of the tool frame unless such rotation is useful to avoid obstacles.

In some cases, the automated robotic tool path planning approaches described herein can be more desirable than some conventional approaches, such as the conventional semi-graphical or semi-automatic approaches described above, because such approaches often have to be implemented in combination with user input, which can result in low efficiency paths, require extensive computational time, and result in delays in planning and material processing times.

DETAILED DESCRIPTION

In some aspects, the systems and methods described herein can be used to more easily and more efficiently plan a material processing sequence to be performed by a tool coupled to and moved by a robotic tool handling system by exploiting one or more available additional degree of freedom of the handling system, such as manipulating rotation of the tool about its longitudinal axis and evaluating a variety of potential robotic tool paths in an exhaustive manner to determine a most desirable tool path. In some cases, an exhaustive analysis can be performed by comparing a potentially required robotic system configuration to be able to deliver the tool in its intended position to actual physical parameters of the robotic tool handling system and analyzing if, based on the known physical parameters, the robotic tool handling system could indeed deliver the tool to the intended location, or if one or more obstacles would limit the robotic system's ability to do so.

Figure 1:
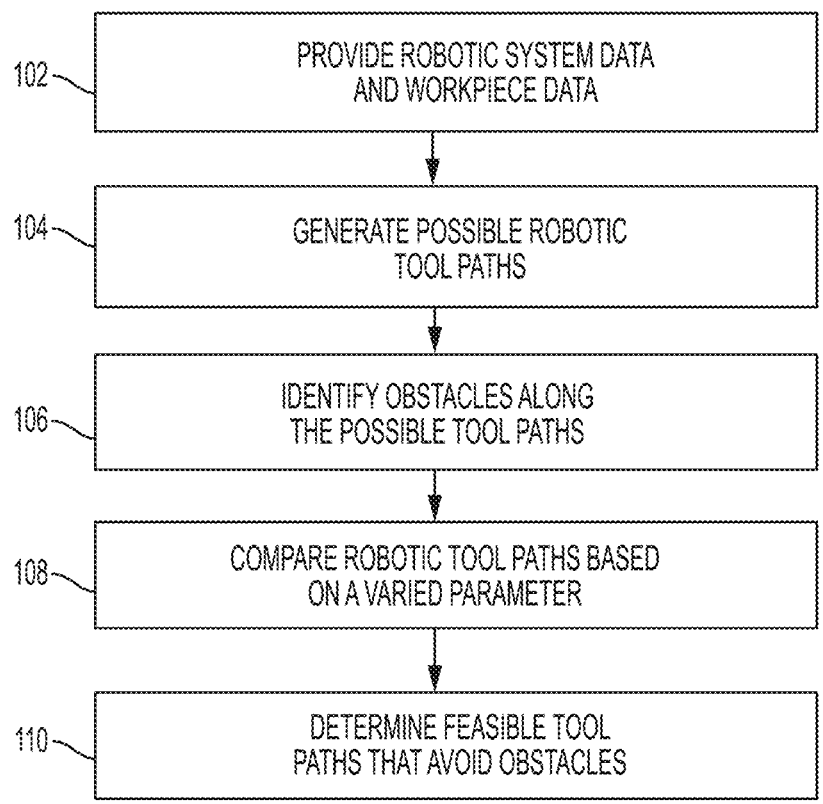
FIG. 1 is a flow chart of an example computer-implemented method for selecting a robotic tool path.

For example, referring to FIG. 1, a computer-implemented method for selecting a robotic tool path suitable for a manufacturing processing system to execute (e.g., perform, carry out) a material processing sequence in three-dimensional space can first include providing to a computer (e.g., in the form of a computer-readable product) robotic system data associated with physical parameters of a robotic tool handling system and workpiece data for a workpiece to be processed by the material processing system. (102) The workpiece data typically relates to a desired processing path along the workpiece (e.g., a path along or proximate to the workpiece) of a tool connected to the robotic tool handling system. The workpiece data can include a tool path program specified by a set of linear and circular moves that the tool must make in order to do the task at hand on the workpiece. In order to analyze the possible robotic paths in an exhaustive manner, as discussed herein, information relating to both the workpiece/desired cut path and the robotic handling system intended to carry out and process and move the tool along the processing path is provided.

The robotic system data can provide a variety of information regarding the robotic tool handling system, which can be used to analyze or determine physical capabilities of the system, such as specific physical parameters (e.g., performance parameters) about the system. The physical parameters of the robotic tool handling system can include dimensions or physical capabilities (e.g., as dictated or influenced by one or more components) of the robotic tool handling system. For example, physical parameters can include robotic arm link lengths, offset lengths, offset angles between joints, and/or joint motion ranges of one or more joints. In some cases, the robotic system data comprises robotic manufacturer information. For a given material processing system (e.g., on a particular CNC system), new robotic system data may not need to be provided for every material processing operation to be analyzed if the same robotic tool handling system is used repeatedly.

In order to analyze the requirements of the tool handling system during a material processing operation, information (e.g., workpiece data) about the intended material processing operation and the workpiece on which the material processing operation is to be carried out is also provided. For example, the workpiece data can include a shape of a workpiece to be processed (e.g., a surface characteristic of the workpiece (e.g., flat or curved)). In some cases, the workpiece data can include the processing path (e.g., a two or three-dimensional processing path) having a defined start point and a defined end point. In some cases, as described herein, the start point is the start of the robotic tool path and the end point is the terminus of the robotic tool path. In some embodiments, the start point does not correlate specifically to a position at which the material processing operation begins, but rather is simply a beginning point for the path analysis to begin. In some embodiments, the terms "start point" and "end point" can be used to refer to, or otherwise represent, bounds or boundaries of the workpiece processing path or the different points described herein to analyze the processing path. For example, the start point can refer to the point at which a first or start column is created or analyzed (e.g., a first point index) and the end point can refer to the point at which a last of end column is created or analyzed (e.g., a last point index). As such, the end point can simply be the n-number of points along the path. That is, the term "point" can be used in the sense of a "program point," wherein, a program is a set of motion commands and the term "point" refers to a motion command in the program. Hence the "start point" refers to the first command of the robot program and the "end point" to the last command of the robot program. For example, the number of command points can be established by the tool path, which is an input provided by the user. In some cases, paths can have infinite start and end points. This makes the systems and methods described herein different from the conventional systems. For this reason, channels can be obtained first. Each channel can have infinite start and end robotic positions, represented by the first and the last columns of the two-dimensional representations described herein, respectively.

To begin the tool path planning method, the processing path is prepared for processing (e.g., pre-processed) so that points along the path (e.g., path points) can be analyzed.

Based on the availability of one or more extra degree of freedom of the robotic system compared to the given path, a plurality of possible (e.g., theoretical or potential) robotic tool paths to be performed to move the tool between the start point and the end point can be generated or determined. (104) As detailed below, one or more points along the processing path (e.g., path points (e.g., specific, individual, selected, or other points along the path)) can be analyzed to determine where and how the robotic system would plausibly (e.g., theoretically) have to be configured (e.g., posed (positioned and orientated)) to be capable of providing the tool to those path points along the processing path. For example, usually a given machining path can include information to restrict 5 degrees of freedom of the robot. However, the robotic system, as discussed herein, can have 6 degrees of freedom. Hence, for each point, the 6th degree of freedom should be determined. This variable should be chosen so the robot path is free of obstacles and robotic errors. Moreover, a plurality of solutions could exist for this variable which could help to optimize the path of the robotic system.

One or more obstacles associated with the robotic tool paths can be identified. (106) For example, based on the robotic system data and/or the workpiece data, obstacles, or regions in which it can be determined that the robotic tool handling system cannot properly be moved or configured to provide the tool into the desired location, are identified.

Next, possible robotic tool paths based on a predetermined robotic parameter to be controlled or adjusted as the tool moves from the start point to the end point can be compared to one another. (108) For example, robotic tool paths can be reviewed and compared to one another as a function of varying a predetermined robotic parameter (e.g., a sixth degree of freedom (e.g., rotating the tool about its longitudinal axis, joint movement preference, etc.)) as the tool would be moved along the processing path. As discussed in detail herein, adjusting or manipulating the tool's angular position during use can be useful to reach, or otherwise provide access, for getting the tool into desired position(s) for processing, so different paths can be analyzed and compared based on the range of possible adjustments to the angular position as the tool is moved. For example, the two-dimensional representation (e.g., robotic path map) that is discussed in detail herein, such as those depicted in FIGS. 2-5 can be analyzed to compare multiple robotic tool paths based on different angular orientations.

Based on the identified obstacles, feasible tool paths can be determined that avoid the obstacles. (110) For example, with the obstacles identified, feasible tool paths can be determined by inspection of the two-dimensional representation. For example, referring to FIG. 3, any path within the green portion 120, free of obstacles, represents a feasible tool path. The areas that are free of obstacles in a region that can connect the start point and the end point continuously or homotopic paths between the start point and the end point can be referred to as channels. As detailed below, one or more channels can be identified on a two-dimensional representation based on a presence or absence of obstacles, different channels can be formed or identified around the obstacles, such as the channel above obstacles in FIG. 4 and a channel below the same obstacles in FIG. 5. The manners in which obstacles and channels are identified and analyzed are described in detail below.

That is, in some aspects, methods can include mapping the tool-path program into a robot program through a process in which the search space is discretized first in to a grid of suitable resolution, wherein, each column of the grid corresponds to the point index (e.g., point along the processing path) in the tool-path. Each column in the grid is composed of a vertical stack of regions, referred to as "pixels", that represent the discretized search space of possible robot postures for that point index. Identifying obstacles can include validating each pixel of the grid for kinematic and collision errors and marking error regions as "obstacles." Identifying tools paths and forming channels can include building a set of horizontal channels, where each channel is a subspace of the grid and represents a set of homotopic feasible robot-paths around "obstacles" (collisions and kinematic errors). A channel also helps to provide that that the robot will stay within joint limits of multi-turn joints as it moves through the first point index to the last.

Additionally, in some embodiments, a preferred (e.g., optimal) robotic tool path can be determined. For example, any of the various techniques or methods described herein for generating a map, analyzing the map, generating channels (e.g., generating and analyzing columns that together form channels) and determining optimal tool paths, such as using channel midpoints, using user selected points, grading pixels, reducing unnecessary movements between columns of channels (e.g., between pixels of adjacent columns), etc. can be implemented to determine the preferred tool path.

The robotic tool paths include positions and orientations of robotic components (e.g., positions of links and angular positions of rotational joints between links) as the tool is moved along the processing path into a desired (e.g., required) position to perform a material processing operation.

As discussed below, various techniques for determining the tool paths can be implemented.

Two-Dimensional Representations

Figure 2:
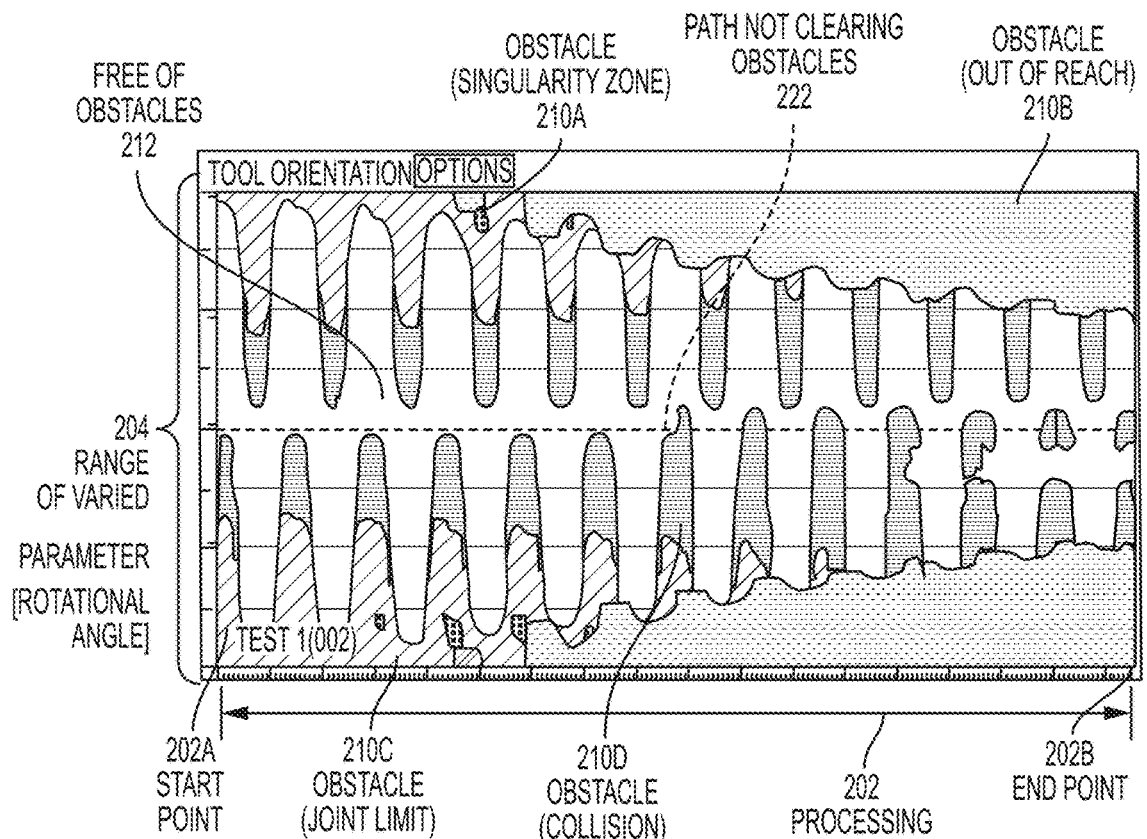
FIG. 2 is an example two-dimensional representation of possible three-dimensional robotic configurations moving a tool from a start point to an end point of an operation/tool path in three-dimensional space, depicting obstacles therebetween.

Referring to FIG. 2, two-dimensional representations can depict a full range of motions and orientations of the robotic tool handling system from along a processing path (formed of processing points) 202 from a start point 202A to an end point 202B (along the x-axis). For example, the two-dimensional representation can depict the robotic tool handling system processing points 202 from the start point 202A to the end point 202B along the x-axis. Along the y-axis, a range of a varied robotic parameter (e.g., a predetermined robotic parameter (e.g., a rotational angle of the tool)) 204 is plotted. The range of y axis is based on the robotic parameter to be varied. By way of example, the varied parameter can be the rotational angle of the tool about its longitudinal axis from −180 degrees to +180 degrees. In some cases, the range of the varied robotic parameter can be −10 degrees to +10 degrees, for example, when varying another joint angle. In some cases, where the extra degree of freedom is a translational axis, the range could be as big as from −1000 mm to +1000 mm.

By comparing the varied robotic parameter (rotational angle) to the position of the tool along the processing path, it is possible to analyze the robotic tool handling system's ability to provide the tool to the different points along the processing, depending on its rotational angle. As such, in the illustrated examples, the two-dimensional representation represents (illustrates) obstacles (e.g., an inability of the robotic tool handling system to provide the tool to that certain positions) 210 based on its longitudinal angle. The obstacles can include physical obstacles or virtual obstacles including limitations of the robotic tool handling system. For example, the virtual obstacles can include joint limitations, singularities, and robotic limitations (e.g., out of reach). The physical obstacles can include physical obstructions in or around the workpiece.

An example of the two-dimensional representation is depicted in FIG. 2. Robotic tool path obstacles 210 are illustrated in different colors. For example, red shows a singularity zone 210A, blue shows a region that is out of reach 210B, yellow depicts joint limits 210C, and dark red depicts collisions 210D. The white color shows a zone substantially free of obstacles 212 in which the robot tool path could pass without encountering the above-mentioned issues. The yellow line going through the center can depict the path of the robot with respect to the robot parameter being varied along the y-axis. The yellow line (shown substantially centered and disposed along the x-axis) passing through an obstacle can depict that the robot will encounter errors while following this path. This line can be represented by a Bezier spline which could be modified by the user to pass through the white zone. In addition to the mentioned limitations, another consideration or obstacle can exist which deals with large motion (e.g., an unnecessary or excessively large motion) of the robot joints. This can be referred to as over travel. Over travel zones at any point depend on the path taken by the robot before that point, and hence, and cannot be shown statically. The concept of "channels" described herein, can be used to determine over-travel-free paths.

Example Methods to Create Two-Dimensional Representations

In some aspects, the systems and methods described herein can be implemented to create the two-dimensional representation (e.g., robotic path map) used to analyze a three-dimensional robotic processing space so that a robotic tool path can be optimized, selected, and implemented to move a tool along a processing path to carry out a material processing operation. For example, a computer-implemented method for determining a robotic tool path for a manufacturing processing system in three dimensional space can include receiving (or providing) robotic system data associated with physical parameters of a robotic tool handling system. Workpiece data for a workpiece to be processed by the material processing system is also received (or provided), where the workpiece data relates to a processing path of a tool connected to the robotic tool handling system along the workpiece during a material processing operation. The robotic system data and workpiece data can include any of the example data described herein for analysis of the robotic handling system's ability to carry out the planned material processing operation on the workpiece.

Based on the robotic system data and the existing extra degrees-of-freedom, a plurality of potential robotic tool paths configured to move the tool along the processing path between the start point and the end point can be calculated. A map can be generated by testing every point in the path for all the possible value of the extra degree-of-freedom. The x-axis of the map is the path point number and the y-axis is the value of the extra degree-of-freedom (varied parameter). For each point, if there is an error at specific value of the varied parameter, the corresponding point in the map can be rendered in the color relating to the error. By testing all points against all values of the varied parameter, the map can be completed.

Next, obstacles can be identified along the robotic tool paths. As discussed in detail below with respect to FIGS. 6-8E, successive path points between the start point and the end point can each be analyzed to determine if and how the robotic handling system is able to provide the tool to that path point based on adjusting a physical parameter of the robotic system, such as angular orientation about the tool's longitudinal axis. This analysis helps to identify obstacles, or as discussed herein, robotic configurations that are unachievable or undesired such that they should be avoided to limit or prevent issues carrying out the material processing operation.

With the obstacles identified between the start point and end point, a collection of the homotopic robotic tool paths (e.g., map) from the start point to the end point as a function of a predetermined robotic parameter to be adjusted during the operation can be presented to a user. That is, a collection of homotopic robotic tool paths can be computed that are guaranteed to be free of all errors including, over-travel and/or joint-limit issues (multi-turn joints), i.e., the non-static errors mentioned above. This collection can be rendered in 2-D and presented as a "channel" running horizontally from the start to the end of the map, and rendered in green color. Hence, as long as the robot stays within this channel, an error free path to the end point is guaranteed, one that is free of all static and dynamic errors. For example, a series of columns (e.g., vertical columns depicting obstacles at each path point) can be presented, where each column corresponds to a particular path point and the series of columns together forms channels about the obstacles. Examples of potential two-dimensional representations are depicted in FIGS. 2-5.

Based on the identified obstacles, feasible robotic tool paths between the start point and the end point that avoid the obstacles can be determined. That is, with a representation of robotic tool paths and the obstacles there about, suitable tool paths that avoid the obstacles can be analyzed and selected for use. As discussed herein, a preferred or otherwise desired tool path can be selected so that a material processing operation can be performed.

Columns Forming Two-Dimensional Representations

The two-dimensional representation is formed of a series of columns that together depict the robotic tool path along the processing path. For example, each column can represent the robotic handling system's position and orientation's abilities at a single point (e.g., a path point) along the processing path between the start point and end point, as a function of the varied robotic parameter. By way of example, the varied parameter can be the rotational angle of the tool about its longitudinal axis (e.g., from −180 degrees to +180 degrees). In some cases, the range of the varied robotic parameter can be −10 degrees to +10 degrees, for example, when varying another joint angle. In some cases, where the extra degree of freedom is a translational axis, the range could be as big as from −1000 mm to +1000 mm.

In some embodiments, the columns can be depicted using columns placed side-by-side to create the two-dimensional representation. In some cases, the columns can include separate discrete regions, each being assigned to a different position (e.g., path point) along the processing path. In some cases, the columns can be formed at incremental distances between the start point and end point. That is, the number of columns formed can correlate to a number of path points analyzed along the processing path, with one column per each path point analyzed.

In some cases, distance between columns, or the width of certain columns, can vary. For example, for regions along which no obstacles are found or determined (e.g., so there is little or no observed changes), one or more regions can be grouped or combined together into a single larger column, which can ease the computational load based on the obstacle identification analysis and grouping.

In some embodiments, the obstacles can be identified by solving robotic inverse kinematic and collision detection equations or algorithms for all possible tool poses (e.g., positions and orientations of the tool) along a user set range along the plurality of possible robotic paths with a predetermined resolution of variable points to be analyzed (e.g., pixels) for each path point along the processing path. In some cases, the predetermined resolution can be about 20 pixels to about 400 pixels.

The two-dimensional representation indicating all no-go areas (e.g., obstacles) is created by a map generating algorithm. For example, in order to generate the tool orientation map, the robot tool is rotated around its longitudinal axis from −180 degrees to 180 degrees based on user-set resolution (e.g., the number of points analyzed between −180 degrees and 180 degrees), the robotic inverse kinematic and collision detection is solved for each orientation sample. Any robotic or collision error for that sample point is marked on the map. This creates one column of the map. The process is repeated for each CAM point of the path (e.g., processing path point) and one column is painted for each point.

The number of channels passing through a given position (e.g., path point) can depend on the number of obstacles identified at that position, which are not connected to the top and bottom of the two-dimensional representation. In some cases, the channels are formed around identified obstacles, where, for a given channel, regions are bound along upper and/or lower ends by obstacles. That is, an obstacle in the middle of the two-dimensional representation typically produces two channels, one above and one below the obstacle (for example, columns 842 and 852 of FIG. 8E). If two obstacles are found along a given position, then they will cause three channels to be formed, one passing from above, one passing in between the obstacles, and one passing below them (for example, column 822 of FIG. 8C). Thus the number of channels is typically 2n_3m where n is the number of non-overlapping obstacles and m is the number of overlapping obstacles pairs. This number could grow exponentially as the number of obstacles grows. In the case of a high number of channels, different types of filters could be used to keep the number of channels to a reasonable number.

By forming a series of separate channels, the two-dimensional representation can be analyzed and manipulated in a more granular manner, which helps to provide more accurate analysis and path planning.

Generating Columns and Two-Dimensional Representations

The columns, and the obstacles identified along different points along the columns, can be determined by analyzing robotic and workpiece data at each path point along the processing path for each joint to form a series of columns that together define channels. For example, referring to FIGS. 6-8E, a method for generating a series of columns to form a channel can include receiving (or providing) processing path data (602) that, as discussed herein, can provide information regarding the workpiece to be processed, as well as the processing path to be followed along the workpiece.

Figure 7:
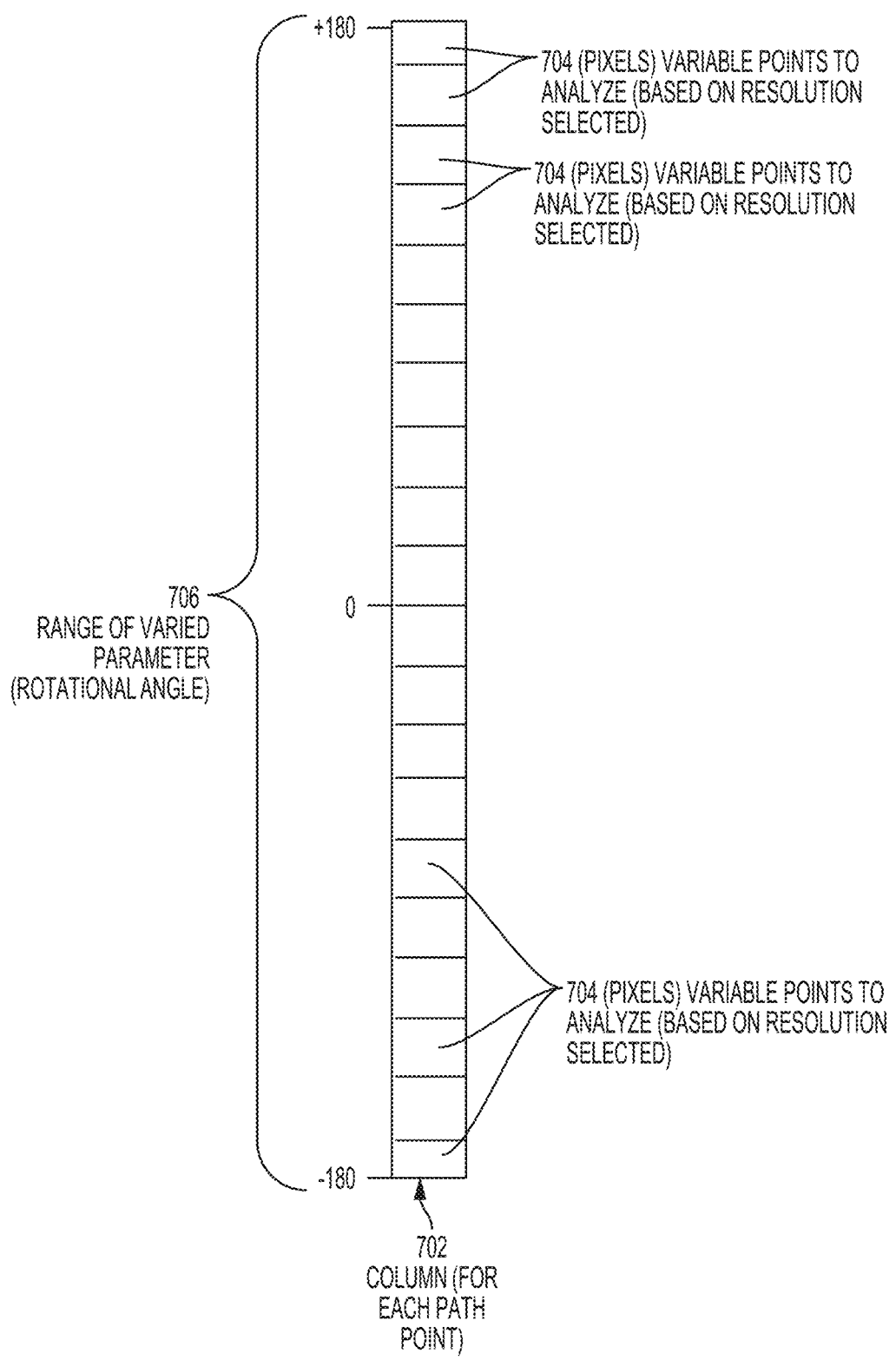
FIG. 7 is a schematic depicting a column of points at a given processing path point to analyze a range of varied robot path parameters.

The analysis can begin, for example, at the start point. (604) Analysis settings are also provided (606) to dictate the: search space (e.g., variables to be analyzed, such as the predetermined robotic parameter (e.g., the angular position of the tool)); range to be analyzed, such as the range of angles of the angular position of the tool to be analyzed (e.g., −180 degrees to +180 degrees); and the resolution of the analysis (e.g., search points at every 1 degree, every 5 degrees, or every 10 degrees). The search space represents the vertical axis of the two-dimensional representation maps depicted in the figures. While the examples herein describe the search space or predetermined robotic parameter as being the angular position of the tool about its longitudinal axis, other examples are possible. For example, in some embodiments, the predetermined robotic parameter to be varied can include tool tilt, which can be varied by at least about +/−15 degrees. Other examples of robotic parameters to be varied include tool positions and rail and rotary positions. In some cases, multiple analyses can be carried out to successively analyze varied parameters to optimize a processing operation. For example, FIG. 7 depicts an example column of points along the range to be analyzed for a particular path point, where the column for the path point to be analyzed is shown by 702 and individual variable points (e.g., pixels) are shown by 704. Multiple variable points (e.g., pixels) 704 are analyzed depending on the desired range 706.

Based on the processing path data, the position along the processing path, and the analysis settings, a set of variable points to analyze can be generated. (608) That is, the set of specific parameters (e.g., angular orientations along the range (e.g., −180, −175, −170 . . . 170, 175, 180) can each be analyzed to determine what or how a robotic tool handling system would need to perform in order to place the tool at the path point being analyzed. Based on this analysis (e.g., the determination of each variable point at the path point), a set of analysis results to be verified are produced. (610) As described herein, this set of analysis results can be described as a theoretical (e.g., possible) robotic system configuration needed to properly deliver the tool for processing.

With the set of analysis results generated, so as to understand what would be required or desired to place the tool into position, robotic system data can be provided (612) to determine whether or not the specific robotic system being used is capable of the required orientation to place the tool in proper position.

With the robotic system data, obstacles along the path point can be identified. (614) In some embodiments, this includes comparing the set of analysis results with the robotic system data to determine at which variable points along the range the robotic tool handling system is not able to adequately provide the tool to the desired position.

Figure 8A:
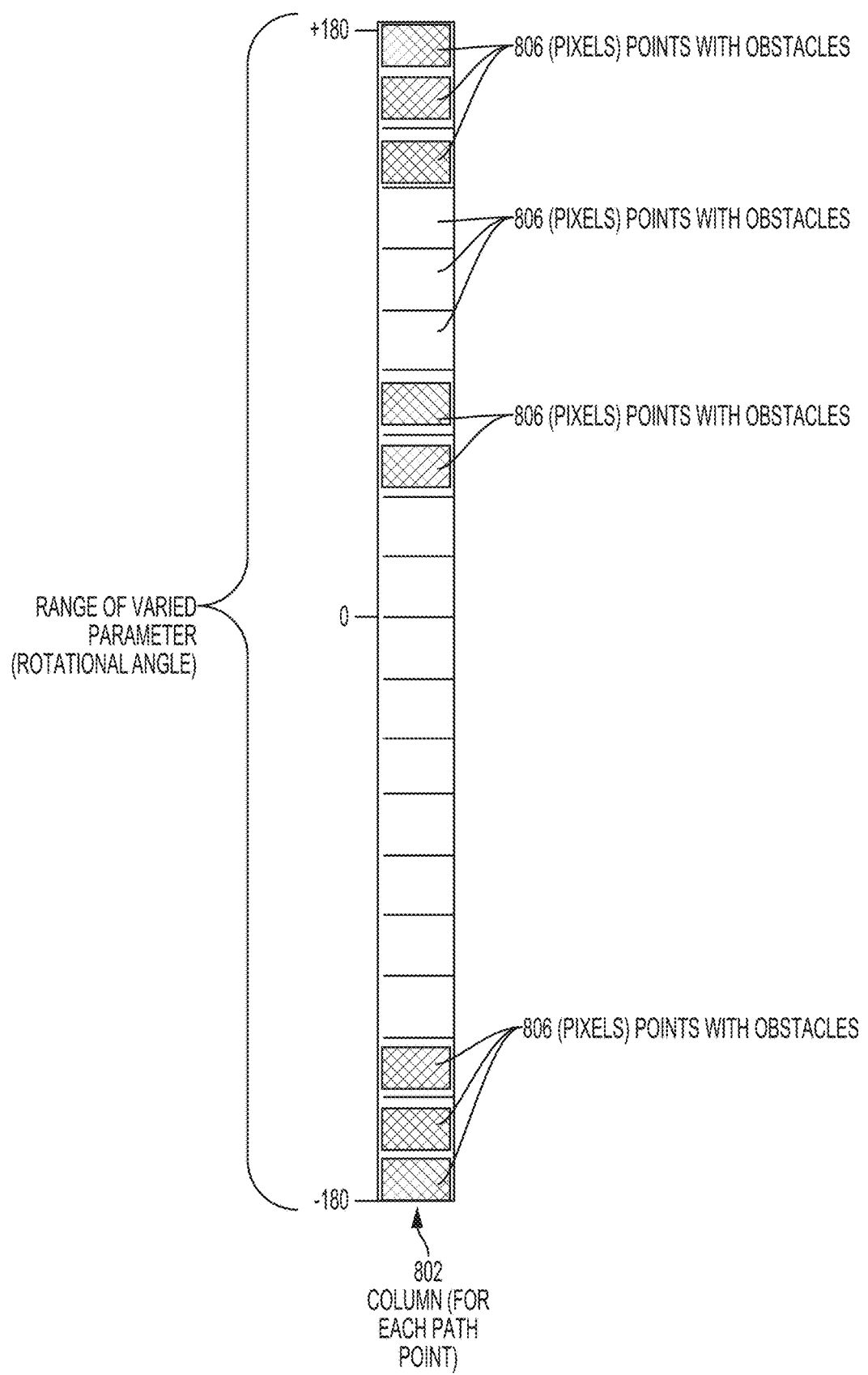
FIGS. 8A-8E depict a sequential analysis of the varied robotic parameters at a series of path points and depiction of obstacles.
Figure 8B:
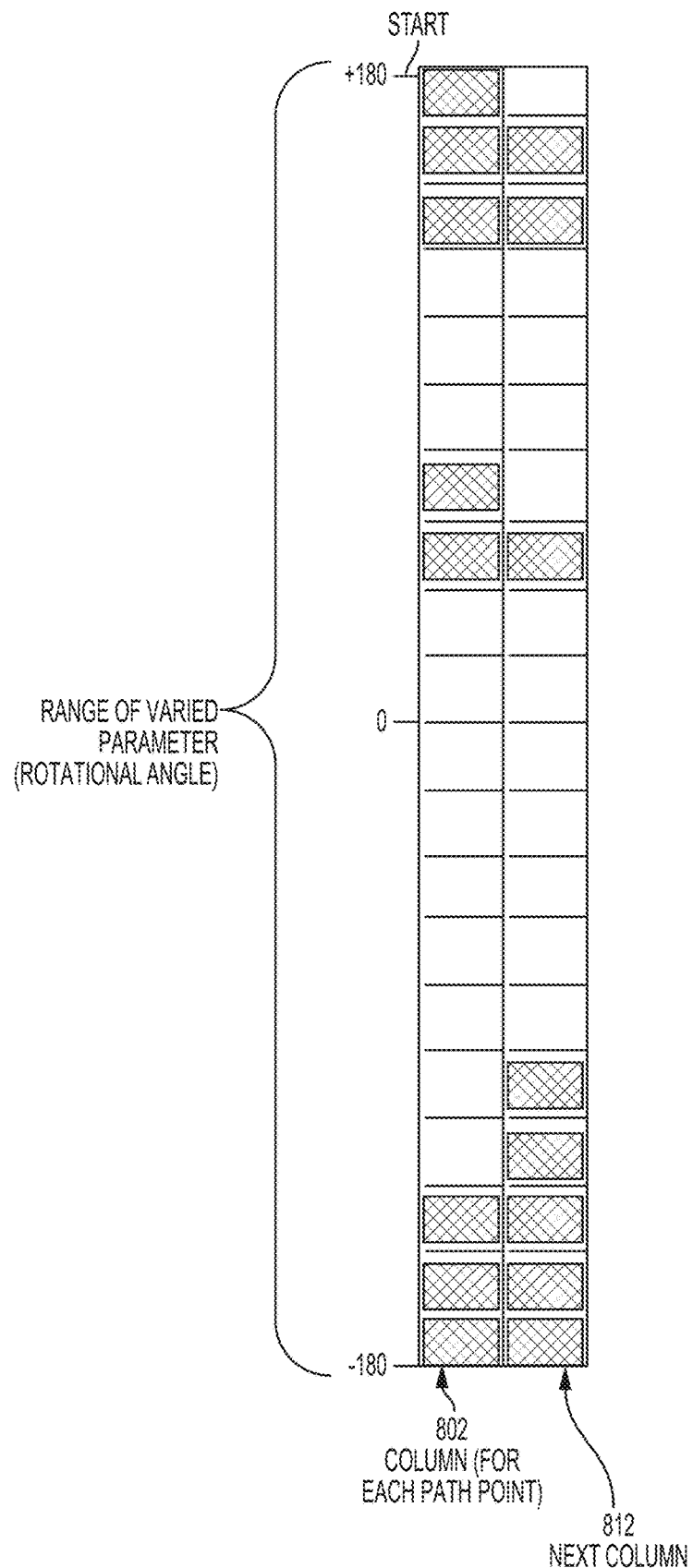
Figure 8C:
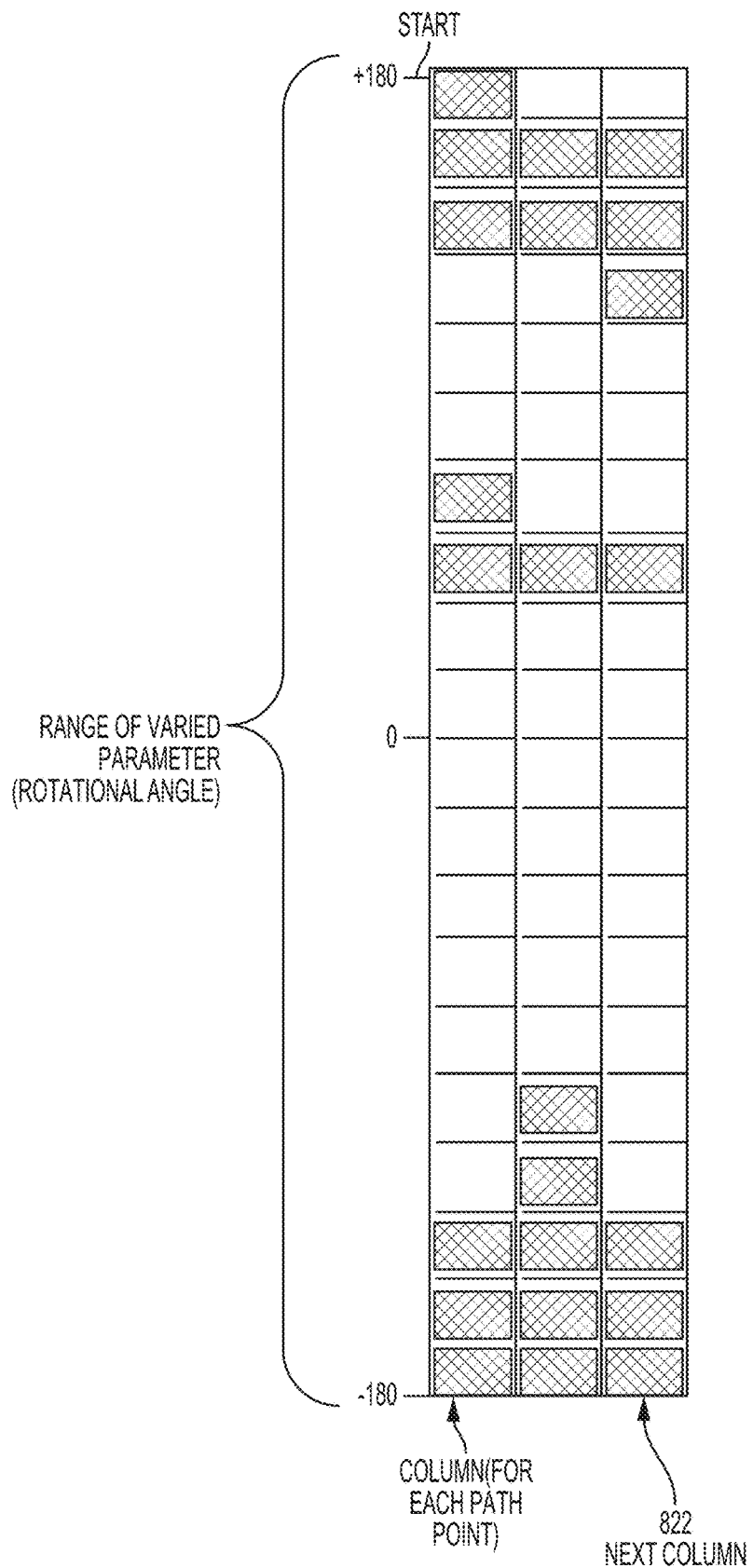
Figure 8D:
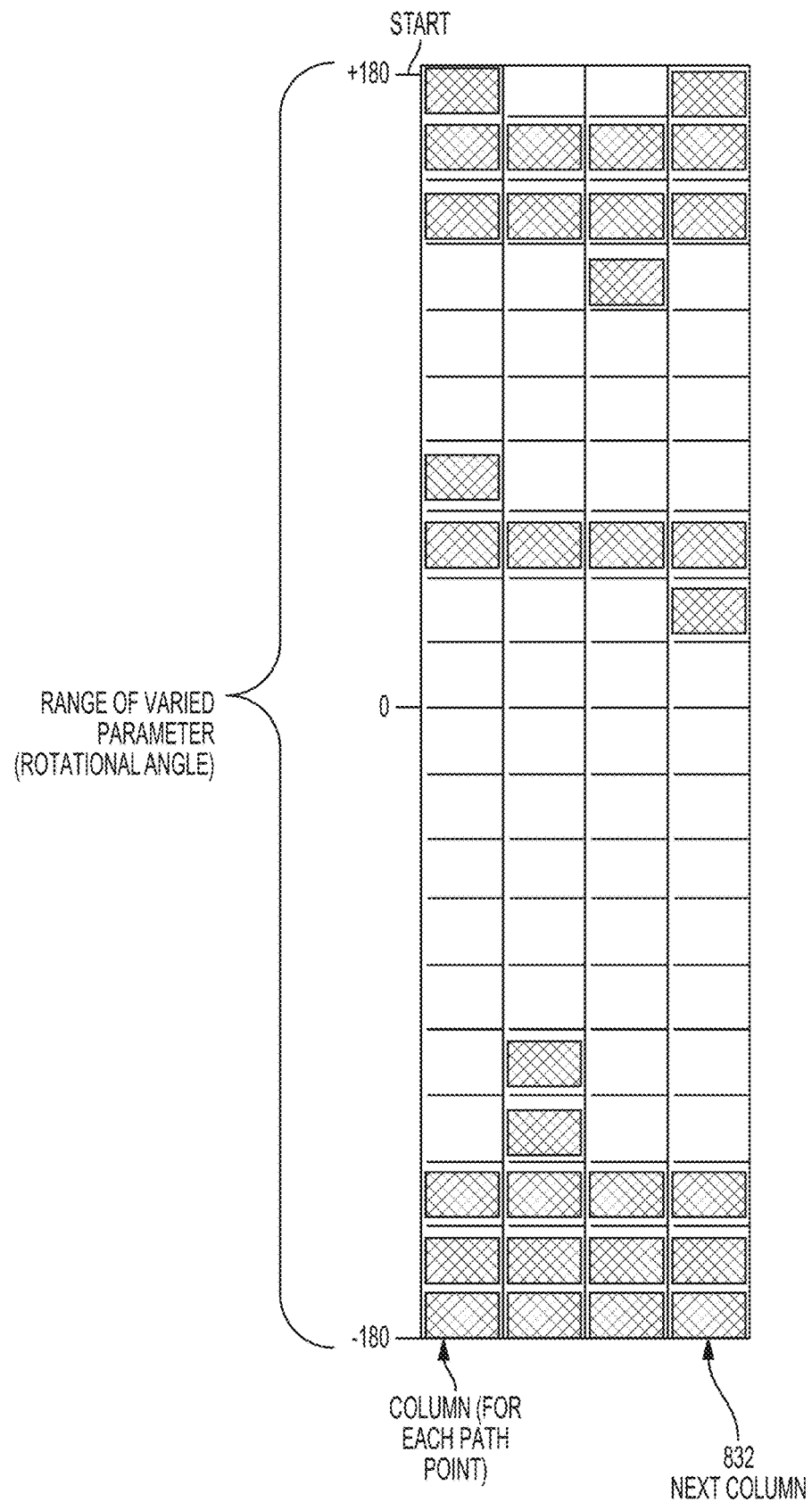
Figure 8E:
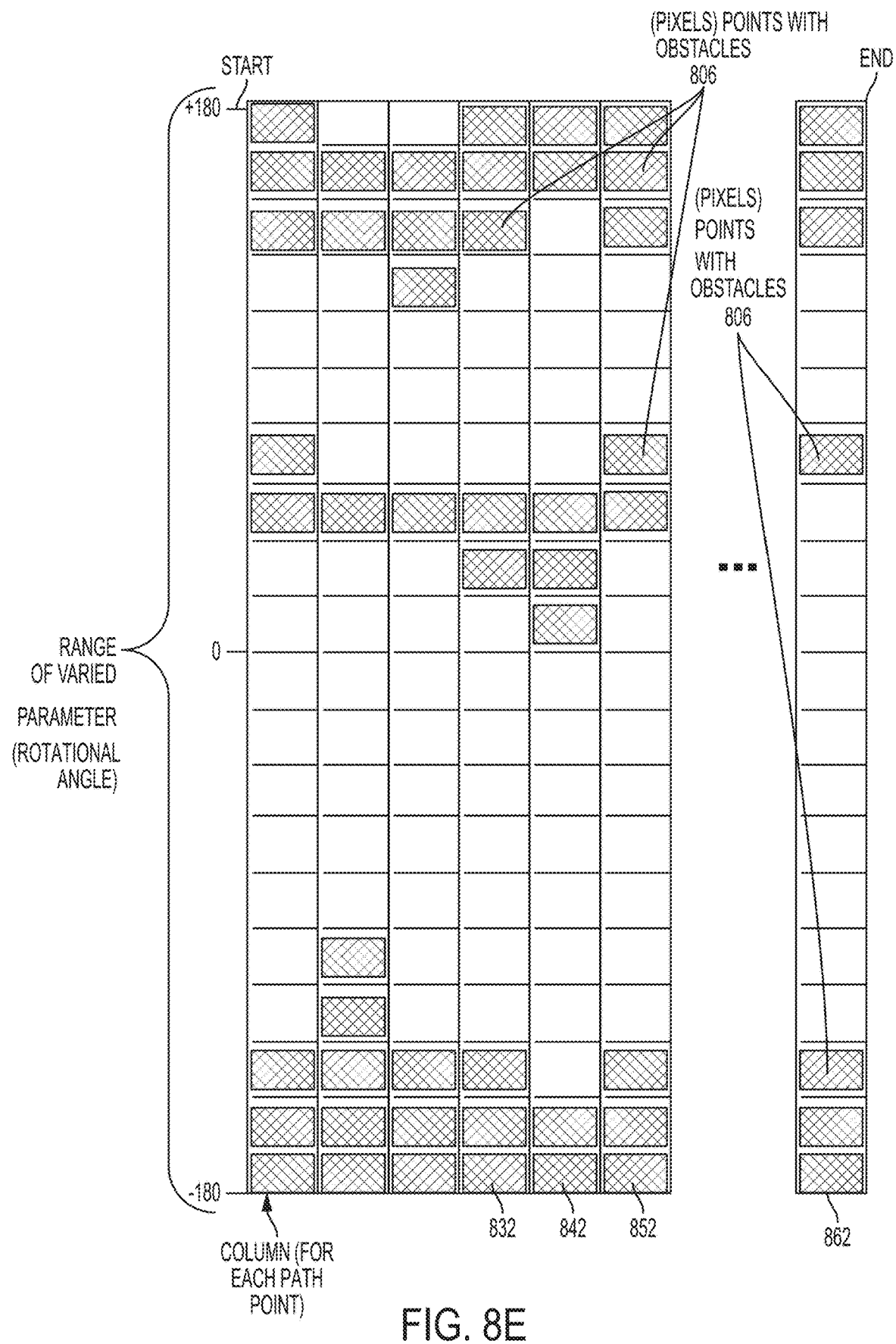

Once the obstacles are identified, the verification results can be presented. (616) In some embodiments, this includes presenting a visual indicator (e.g., the various color/patterns described herein) to indicate to the user that an obstacle is present at that location. In some cases, the results can be presented after each variable point is verified or once an entire column is analyzed. An example depiction is shown in FIG. 8A, where obstacles 806 have been identified at multiple variable points along the column 802. The points at which no obstacles are identified represent regions along the column in which the robotic tool handling system could move freely to deliver the tool to the desired position at the path point.

This process of analyzing the set of variable points at each path point is repeated for each of the additional path points in succession until all path points are analyzed (618) and a complete representation of the obstacles along the processing path at all variable range configurations is produced. For example, a schematic representation of this iterative analysis and presentation is depicted in FIGS. 8A-8E, where new path points are analyzed in columns 812, 822, 832, 842, 852, 862. At the conclusion of analyzing every path point along the processing path, a full two-dimensional representation, such as those in FIGS. 2-5 can be presented.

In some embodiments, the columns and obstacles can be created by analyzing the two-dimensional representation in several stages. In the first stage, a static map can be used to create the columns. The static map is a map (e.g., representation) that includes obstructions that are not expected to move or be altered based on tool orientation, such as out of reach, joint limit, singularity, and collision error. That is, these obstacles typically do not move as we change the tool orientation of the robot in the map. In some cases, the static map might not have any obstacles. In such cases, one channel can be created for this map that covers the whole map, as there are no changes or obstructions at any point along the processing path.

In another example, one mass of obstacles can appear in the map. For such map, two channels can be created, one that passes above the obstacle and one that passes below the obstacle. Separating the channels into one above and one below can help to ensure that the channels are homotopic such that a path can be formed therethrough. As the number of obstacles grow in a given map, for example as layers are added, the number of possible channels increase exponentially (e.g., because typically two channels are formed for each obstacle).

In a second phase, joint angles relating to each point on the map can be analyzed. For example, for any two-neighboring path points in a channel, the system can check to determine if joint angle changes are within the robot limit (e.g., if the joints of the robotic system are capable of moving that quickly or reaching such angles). If the joint angle changes are greater than the given limit (over travel), that point is removed from the channel to provide a discrete obstacle. This process can continue until all points in the channel are checked for overtravel.

Identifying Obstacles (e.g., Non-Static Obstacles)

In some aspects, the two-dimensional representation can be formed by combining one or more data layers from analyzing the three-dimensional space into a set of channels for display and analysis. For example, each joint has two layers, each layer representative of a certain condition/concern.

The static map can inform the user where the obstacles are located but, in some cases, does not tell the user how to avoid the errors. For each point on the map (e.g., each point analyzed along the range of varied robotic parameter), multiple sets of joint solutions exist. For example, in some robotic systems, the motion range of the 4th and 6th joints on an example robotic system are from −360 degrees to +360 degrees, and all other joints are from −180 degrees to +180 degrees. This means that joint 4 and 6 can rotate two turns (also called as multi-turn joints). If the joint solution of a checking point is (45, 30, 60, −200, 70, 200) (in degrees), because the motion range of the 4th and 6th joints has two complete turns (also called as multi-turn joints) available in this example, three other solutions for this checking point can also exist:

(45, 30, 60, −200, +360, 70, 200),
(45, 30, 60, −200, 70, 200, −360),
(45, 30, 60, −200, +360, 70, 200, −360).

Each joint solution creates a layer.

Repeating this on each point on the map creates four solutions for each point on the map. Based on the turn that joint 4 and 6 are in a layer of solution can be created for the map and overall 4 layers of solutions are created for this example.

A feasible robot path can traverse from one layer to another if there exists a continuous connection between the two. Although a user sees a 2D map and a path on that, this path could have passed through any of these layers based on where it is coming from. This means that two paths that intersect at a point in the map could be in different layers if the previous sections of the map are not the coinciding. During the creation of a channel the non-static (e.g. overtravel) errors are also considered. A single channel represents the merge of the layers and the connections, while respecting homotopy. Here an over-travel is a jump from one layer to another layer in the absence of connection.

Generating Channels

The two-dimensional representation is formed of a series of columns that depict an area of all the possible good robotic tool path along the processing path. Channels can also be referred to as the classification of all the acceptable robotic paths. As discussed herein, any obstacle in the map creates two sets of channels one passing from the bottom of the obstacle and the other one passing above the obstacle. The number of channels at a given map depend on the number of obstacles in the map, which are not connected to the top and bottom of the two-dimensional representation. In some cases, the channels are formed around identified obstacles, where, for a given channel, regions are bound along upper and/or lower ends by obstacles. If two obstacles are found in the given map, then they will cause three channels to be formed, one passing from above, one passing in between the obstacles, and one passing below them. The number of channels could grow exponentially as the number of the obstacles grows. In case of a high number of channels, different types of filters could be used to keep the number of channels to a reasonable number.

In some aspects, methods can include building a set of horizontal channels, where each channel is a set of homotopic feasible robot-paths around "obstacles" that guarantees that the robot will stay within joint limits of the multi-turn joints.

By forming a series of separate channels, the two-dimensional representation can be analyzed and manipulated in a more granular manner, which helps to provide more accurate analysis and path planning.

Analyzing Two-Dimensional Representations

Once the two-dimensional representation is formed and the obstacles can be identified, the robotic tool path can be reviewed and selected (e.g., to determine an optimal or otherwise desired tool path by altering the path in the corresponding degree of freedom) using the map that defines or otherwise indicates boundaries or locations of the obstacles. That is, in some embodiments, the systems and methods described herein can include progressively analyzing the set of channels to identify an optimal homotopic tool path between the start point and the end point that avoids the set of obstacles. That is, methods can next include selecting one of the one or more acceptable robotic path configurations to be used to perform the robotic processing operation along the workpiece. Various techniques can be implemented to determine a desired (e.g., optimal) tool path.

For example, in some aspects, a computer-implemented method for determining a preferred (e.g., optimized) robotic path configuration for performing a robotic processing operation along a workpiece can include providing a two-dimensional representation of a plurality of possible three-dimensional robotic tool paths to be performed to move a tool connected to a robotic tool handling system along the workpiece along a processing path between a selected start point and end point, the two-dimensional representation identifying, based on robotic system data and/or workpiece data, where one or more obstacles associated with the robotic tool paths are located. Identifying the obstacles can be performed in any of the various techniques described herein.

Based on the identified obstacles, a set of channels about the set of obstacles to indicate feasible homotopic tool paths between the start point and end point that avoid the obstacles can be generated. As discussed herein and depicted with respect to FIGS. 6-8E, the channels can be created by analyzing multiple path points between the start point and end point and generating a column of pixel for that path point, where a series of columns together create the channels.

Figure 13:
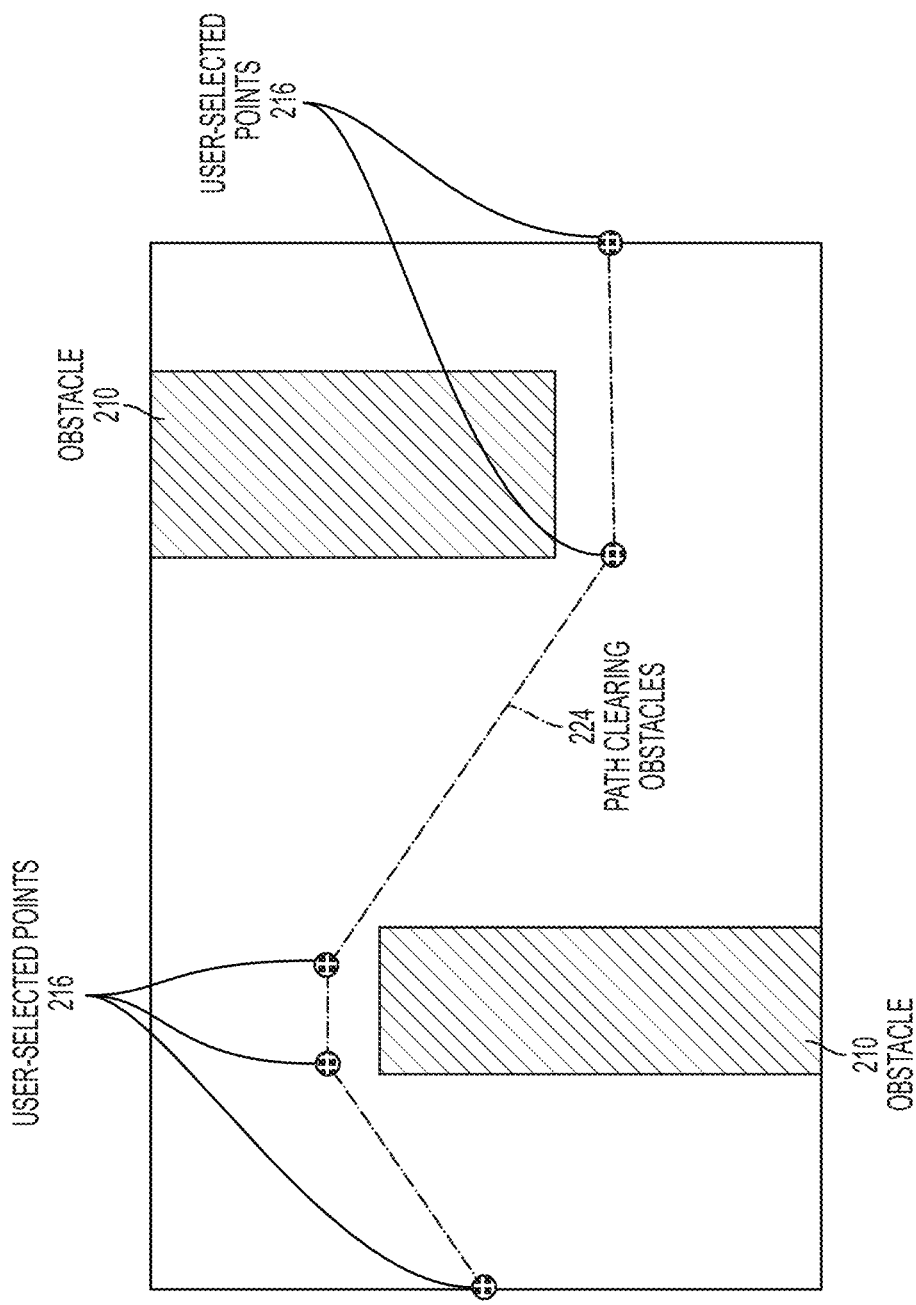
FIG. 13 depicts an enlarged view of an example two-dimensional representation, showing user-selected path points around obstacles.

Based on the map columns, one or more acceptable robotic path configurations can be determined for performing a robotic processing operation along the processing path on the workpiece, in accordance with any of the various techniques described herein. For example, determining one or more acceptable robotic path configurations can include receiving one or more user-selected points along the two-dimensional representation and forming a robotic path configuration that passes through the user-selected points by analyzing each remaining channel to determine an acceptable path through each channel and linking the determined acceptable paths through each adjacent column. An example path 224 is depicted in FIG. 13, where points 216 are selected to avoid obstacles 210, and the path 224 is configured to pass therethrough. In some embodiments, the determining one or more acceptable robotic path configurations can include presenting the two-dimensional representation to a user and receiving a user's instructions for a desired robotic path configuration.

In some aspects, the progressively analyzing can include progressing substantially linearly from the first point index (e.g., start point) toward the last point (e.g., end point); upon impact, searching along the vertical direction within the channel in order to establish a path point, referred to as a "support point", through which the resulting robot-path shall pass; connecting the last support point with the current support point; and progressing toward the last point.

Analyzing Channels to Determine Preferred Robotic Tool Path

As described herein, in some embodiments, determining one or more acceptable robotic path configurations to move the tool from start point to end point can include analyzing each channel (e.g., a series of columns) to determine an acceptable path through each channel and linking the determined acceptable paths through each adjacent column of the channel to form an acceptable robotic path configuration and analyzing each channel to determine an acceptable path through each channel. In some cases, the linking adjacent columns of channels can include determining a midpoint along each column of channel and forming a path through midpoints of each column.

In some aspects, methods can include identifying a preferred robot-path within each channel. That is, since a channel is already a set of robot-paths that are free of collision and robotic errors, for each channel, the best robot-path "representing" that channel can be identified.

Figure 4:
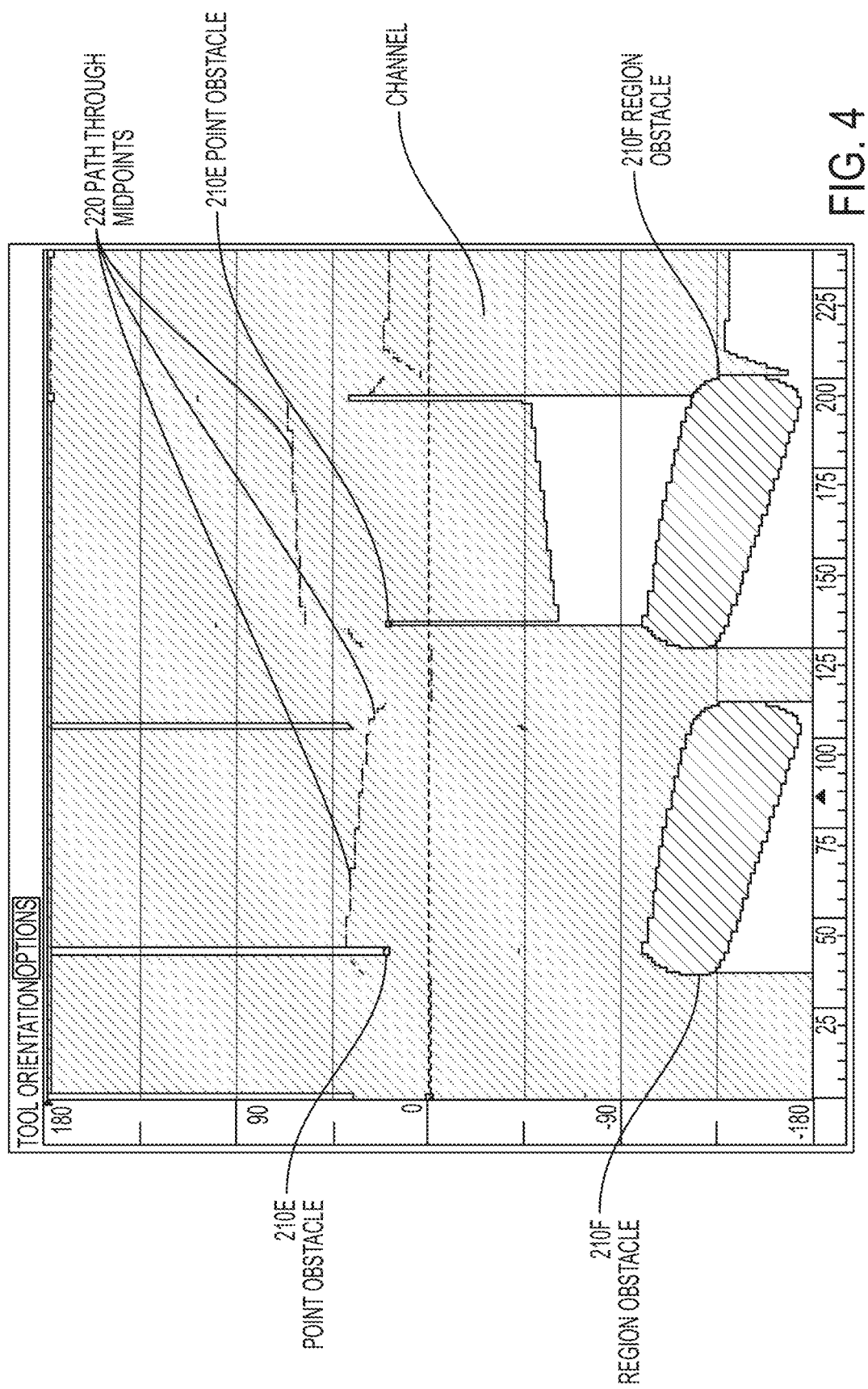
FIG. 4 depicts an example two-dimensional representation of channels formed about obstacles, with a proposed tool path along channel midpoints.
Figure 5:
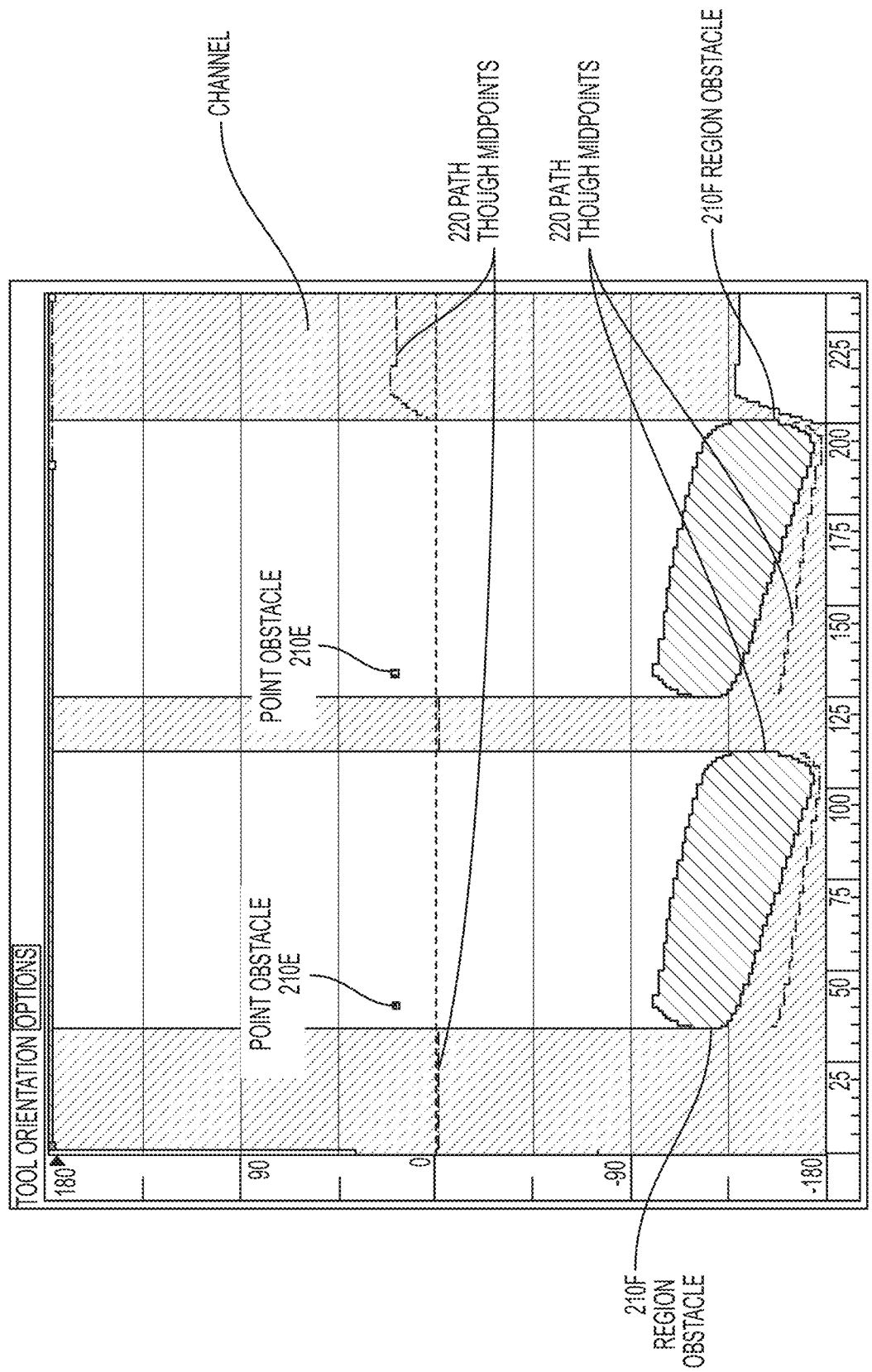
FIG. 5 depicts another example two-dimensional representation of different channels formed about the obstacles of FIG. 4, with a proposed tool path along channel midpoints.
Figure 6:
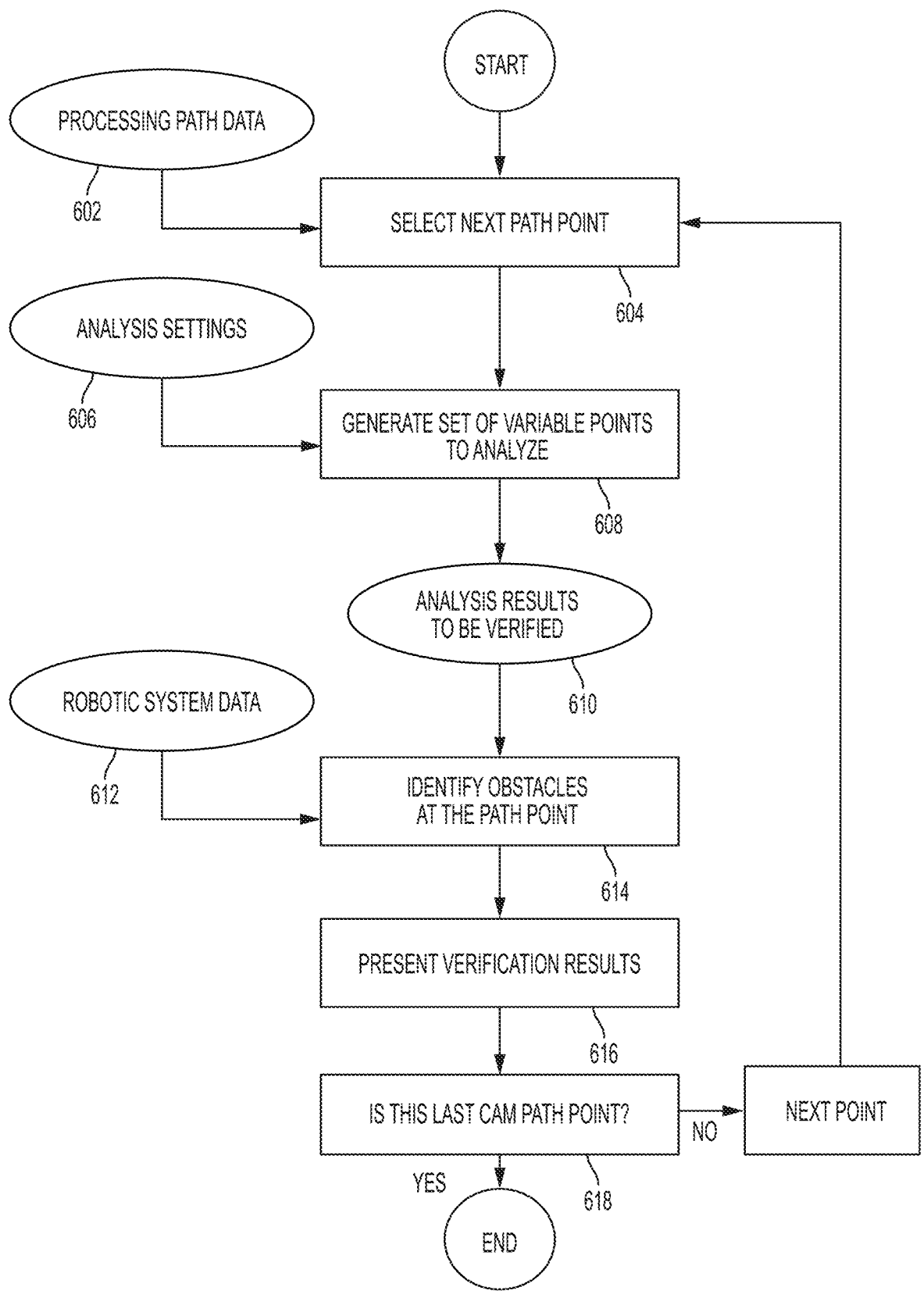
FIG. 6 is a flow chart of an example sequence for forming a two-dimensional representation to depict obstacles.

In some embodiments, to further optimize or compare different potential robotic path configurations, methods can include for each of the one or more acceptable robotic path configurations, calculating a distance between midpoints of adjacent columns of the channels. Some embodiments can include selecting one of the one or more acceptable robotic path configurations to be used to perform the robotic processing operation along the workpiece based on an accumulated calculated distance between midpoints of adjacent columns of the channels for each path. The selection is based on the path having the least accumulated distance. That is, in comparing multiple potential robotic paths, distances between midpoints can be calculated to determine which of the various options would result in fewer unnecessary or excessive movements or adjustments, which could cause a negative impact and waste energy. For example, FIG. 4 depicts an example two-dimensional representation where a channel is shown in between and around point obstacles 210E and region obstacles 210F with a series of dots (forming lines) 220 at midpoints through each column of the channel to present a feasible tool path. FIG. 5 depicts alternative possible channel selection that avoids the same obstructions/obstacles as those of FIG. 4 but, as illustrated, are able to have a series of midpoints 220 that, due to the selected columns (e.g., below the region obstructions) form a more continuous (e.g., less erratic or tortuously formed around the obstructions) line. In some cases, the robotic tool path can be formed by starting with this connection of midpoints of the channel and then "smoothed" to provide better transition areas. As such, a path chosen to follow the channel identified in FIG. 5 (e.g., through the respective midpoints or otherwise) could result in a more desirable robotic tool path than through the channels of FIG. 4.

As such, a goal of selecting a desired robotic tool path is to have less deviation from the current point (e.g., any given point) along the path. In order to reproduce this behavior in an algorithm, a cost factor is introduced, and for a given path, there is an effort to try to minimize that cost as the path is generated. Here methods can be used to generate the path based on the cost-to-go (e.g., an amount of deviation from the current path). In other words, the path can be generated to achieve the minimum cost-to-go. A path is considered to have a greater cost if the consecutive points are far from each other (e.g., which indicates a greater variation between points). Other costs could be considered due to different criteria for other purposes or goals. Applying such costs to the path generation algorithm are helpful to provide a fitted path to the channel.

That is, in some embodiments, each channel of the set of channels includes a distinct column comprising a plurality of distinct pixels, and individual pixels of channels can be analyzed. For example, the system can progressively analyze the set of channels by grading each pixel in the set of columns. In some cases, the grading can be performed starting with an end column (e.g., at the end point) of the set of columns and progressing toward the start point (e.g., at the start point) through each column. For example, in some embodiments, each pixel (e.g., each of the variable points analyzed along a column, such as variable points 704 depicted in FIGS. 7-8E) in the column (e.g., column 702) can be graded. The grading can be performed in a way to try to keep the path as close as possible to its previous situation (e.g., position). The approach for this example is to start the grading from the last column of the channel and move backward to grade the whole channel. An arbitrary number for all the pixels in the last column can be chosen. For the column before the last, the same value as in the last column can be used unless the column has a no-go zone area (e.g., obstacle). The cells that are no-go zones do not need any grading. Proceeding backward from column to column, some cells in the column could be before a no-go zone in the same row. These cells need to be graded. To grade these cells, the grade of the first cell below or above in that column which has a go zone cell can be used in the next column, and can be reduced by a point from that grade for each cell moving upward or downward. This is continued until the beginning of the channel is reached.

The same grading procedure can be done another time in the opposite direction, from the first column (at the start point) to the last column (at the end point). The overall grade of each cell can be the summation of the grades found in each step. That is, in some embodiments, the analysis can include further grading the pixels a second time. For example, the second grading can start from a start column (e.g., at the start point) of the set of columns and progresses toward the end column (e.g., at the end point), wherein a summation of the grades found from going both toward the start point and toward the end point is then used to grade the pixels and determine a preferred robotic tool path.

In some embodiments, the channels can be analyzed in sequence based on their location or orientation with respect to one another. For example, the progressively analyzing can include sequentially analyzing channels in a directional manner. In some cases, the analysis can be performed by progressing substantially linearly from the start point toward the end point; identifying a first path point in an opposite axis of travel upon linear impact with an obstacle, the first path point being linearly clear of the obstacle; charting a first portion of the robotic tool path directly between the start point and the first path point; and progressing toward the end point.

Additionally or alternatively, in some cases, the progressively analyzing the set of channels can include initiating an analysis at either the start point or the end point, and selecting the adjacent channel, column, or pixel that is along the most direct route toward the first point or the second point and continuing to do so in adjacent channels, columns, or pixels.

Figure 9:
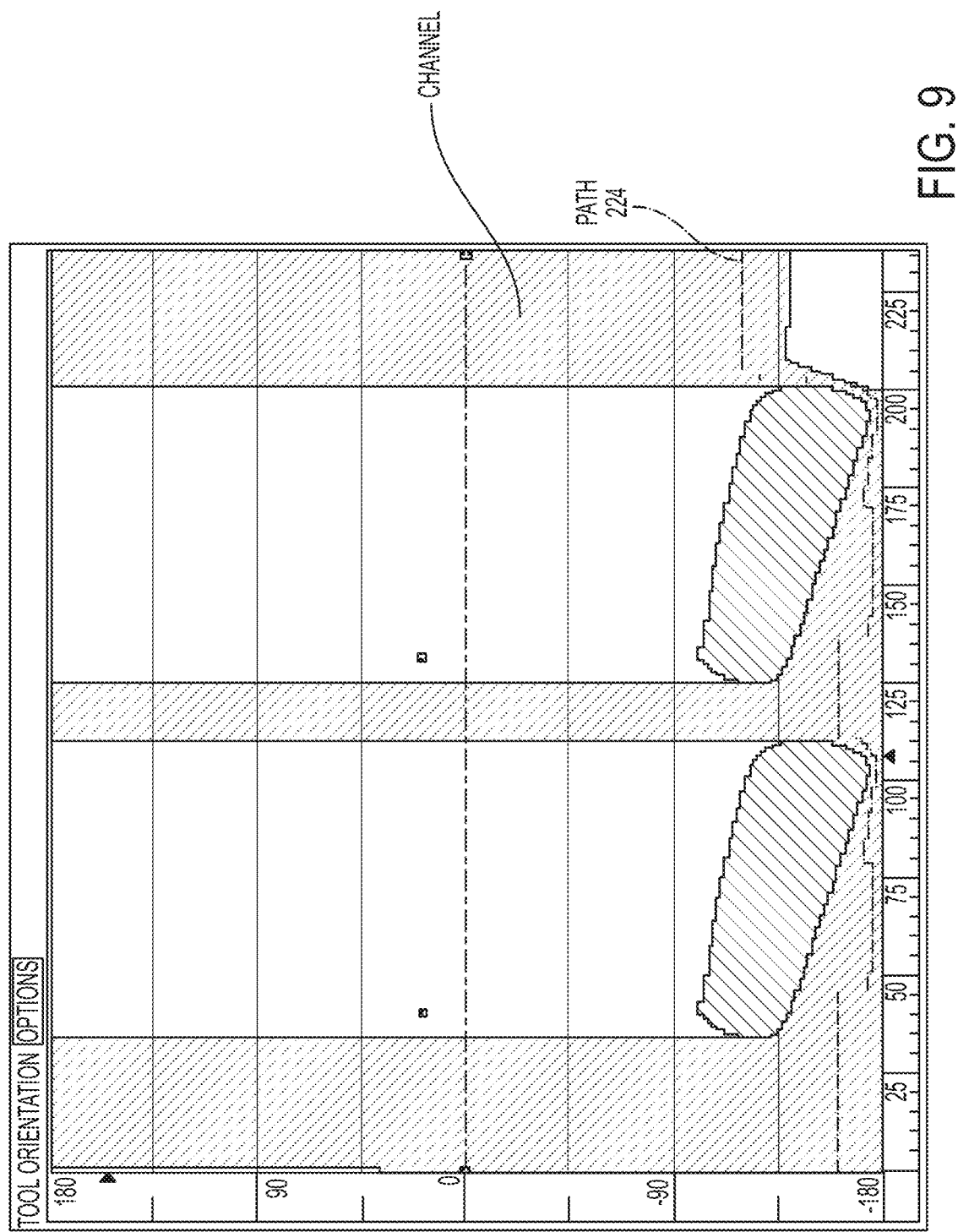
FIGS. 9 and 10 depict example tool paths to avoid a set of obstacles using a first path selection algorithm.
Figure 10:
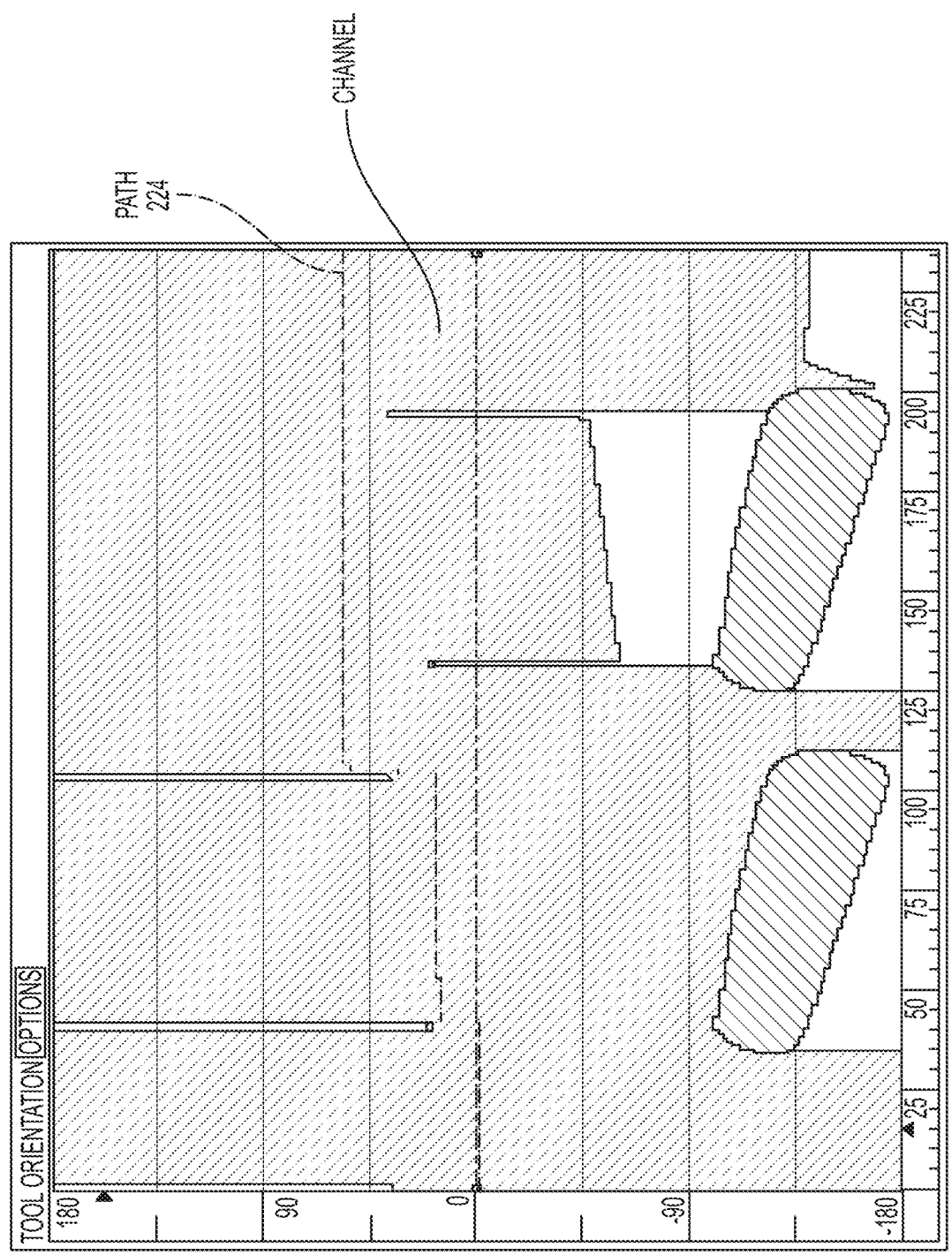

After all of the columns have been graded, the path generation starts from the first column. In the first column, the maximum value of the column can be selected. For the second column, a search can be performed in a range about the previous selected pixel. The maximum value in that range can be selected as the next point. The range could be selected by the user. The point selection can be repeated for the rest of the columns. FIGS. 9 and 10 show how path points can be generated for columns based on a reduced or minimized "cost to go" approach.

It can be seen that this method improves the path planning compared to the first proposed method, such as the midpoint approach shown in FIGS. 4 and 5.

As shown, the generated paths 220 are typically not satisfactory due to the sudden jumps that happen along the path 220. Moreover, this path 220 could be considered far apart from a path that a person (e.g., the user) would draw manually. In other words, a goal of the systems and methods described herein can be to produce a path that is very close to what a human would draw to avoid the obstacles 210 while providing for more natural and smooth paths.

Figure 11:
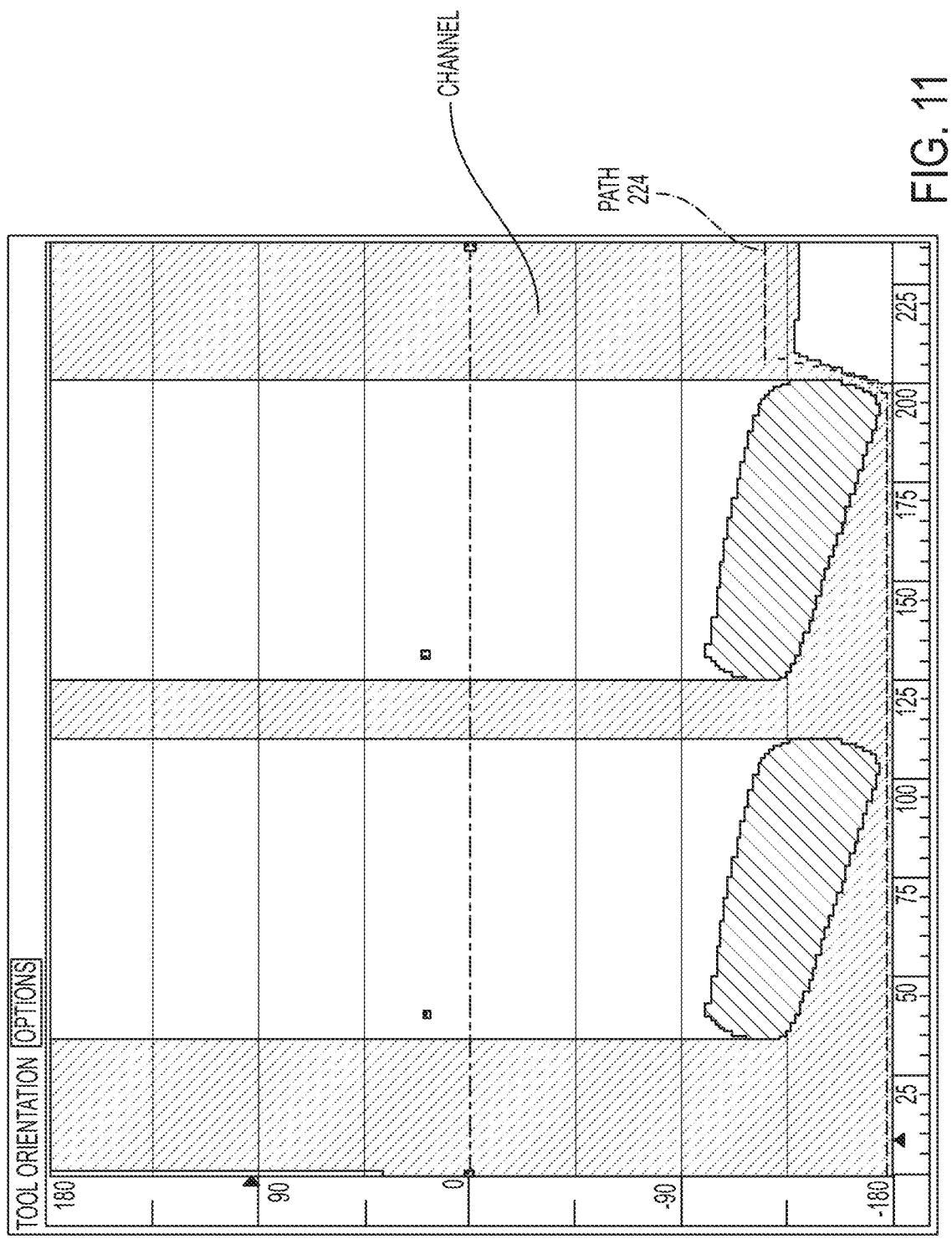
FIGS. 11 and 12 depict example tool paths to avoid the set of obstacles using a second path selection algorithm.
Figure 12:
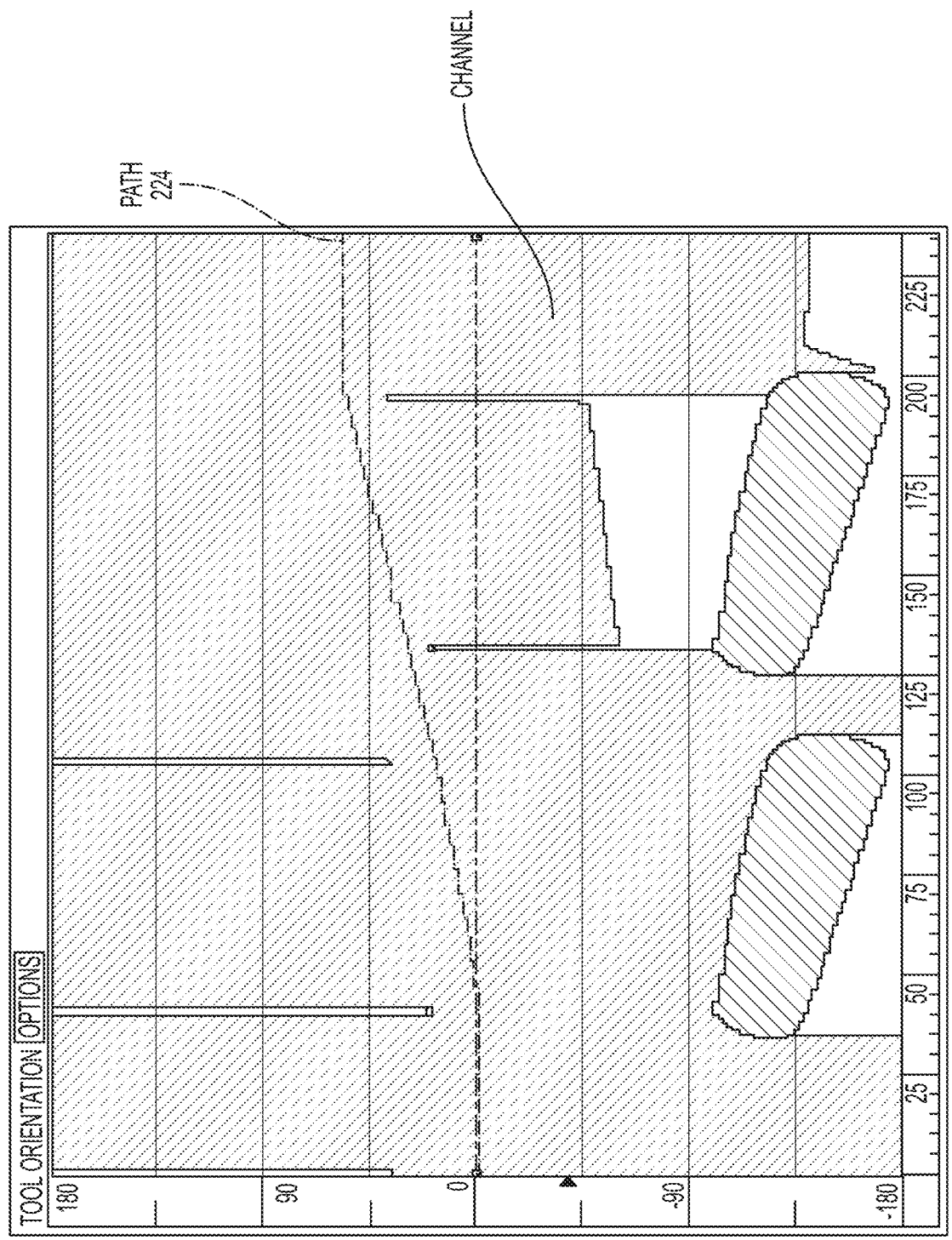

However, in some embodiments, additional approaches exist to provide a smoother tool path. To enhance the outcome further, in some embodiments, another algorithm can be implemented to generate the path within the channels. For example, a geometric approach can be used. A goal for this approach is to further avoid obstacles. A path can start with a straight line and deviate if (and only if) an obstacle is found or predicted to be disposed in front of the path. If so, the path can be altered to pass either above or below the obstacle based on the channel. After passing the obstacle, the path can continue in a straight line until it observes another obstacle. The algorithm continues and recursively checks for obstacles and creates new lines until it finds its way to the other side of the obstacle. FIGS. 11 and 12 illustrate results of implementing this algorithm. As intended, these results yield a smoother path as compared to the other two algorithms. Moreover, the speed of this algorithm is faster than the previous algorithms. The computation time for this algorithm is proportional to the number of the obstacles being hit (e.g., avoided) in the process.

Ordering the Channels

To be able to select the best path for the robot it is desirable to find the channel providing the best path. To order the channels, a path is created in each channel using the above-mentioned methods. Then the channels are ordered based on the path created in that channel. A criterion could be chosen to compare the paths. For example, one criteria could be the straightness (e.g., low deviation) of the path. This means that the channel that has a straighter path will have a higher ranking. An automated algorithm can offers the best channel. However, the user can still have the possibility to select a lower rank channel if the desire.

Figure 3:
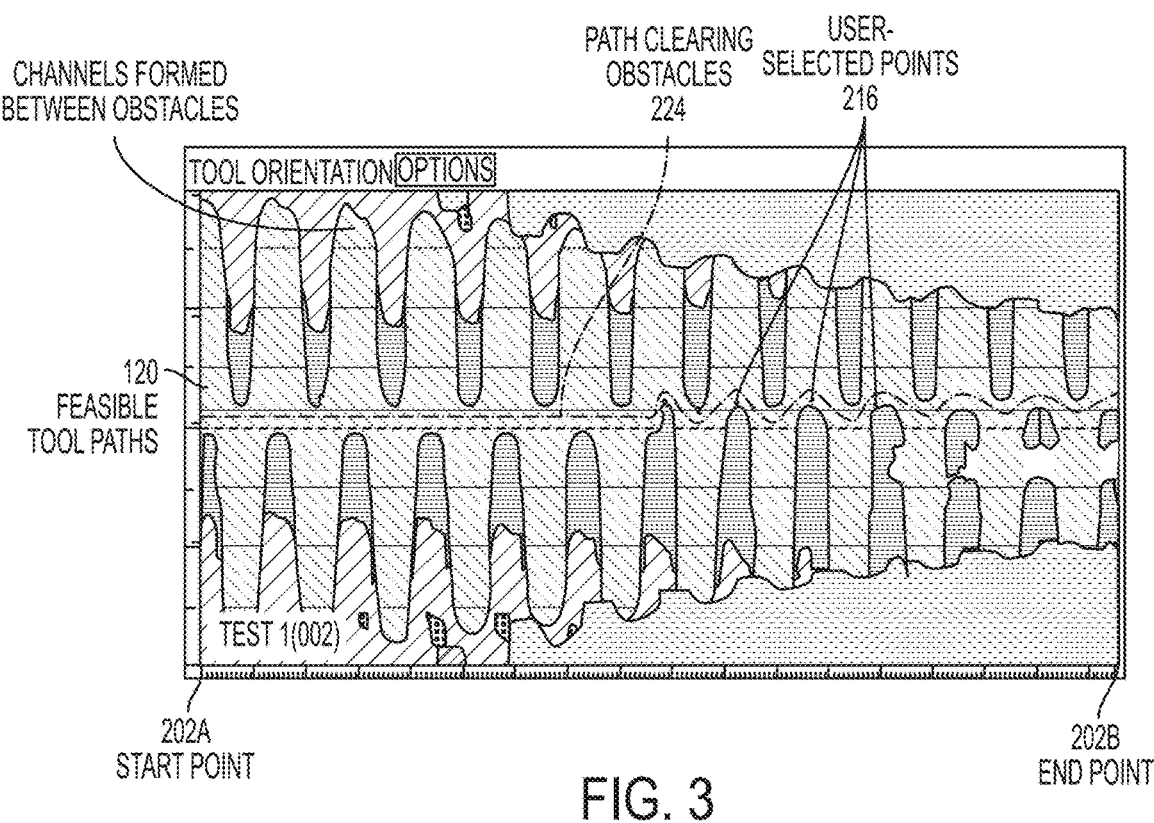
FIG. 3 depicts the two-dimensional representation of possible three-dimensional robotic configurations with a tool path formed through a channel formed of a series of columns to avoid the obstacles.

In addition to simply analyzing the robotic system's capabilities, the methods herein can include selecting one of the acceptable robotic path configurations based on performance parameters of a component of the robotic tool handling system. That is, by way of example, the user can select one or more joints and set additional limits on angular orientation, or could select one or more joints (e.g., larger joints) to avoid articulating unless needed. In some cases, joints or actuators in the system can be weighted or ranked according to preference for use. For example, FIG. 3 depicts a path 224 avoiding obstacles that passes through multiple user-selected points 216. FIG. 13 depicts an enlarged view of a path 224 passing by obstacles 210 by passing thought user-selected points 216.

In some cases, the preferred robotic tool path can include a user selecting one or more boundary points for the preferred robotic tool path around one or more obstacles. As depicted in FIG. 3, a user can select one or more points 216 to be sure that the tool path 224 clears certain obstacles. In such cases, a user can select one or more of the points 216 to define the tool path, and the remaining points along the path can be determined by any one or more of the other path determining techniques described herein. By way of comparison, FIG. 3 illustrates a tool path 224 that clears the obstacles identified, whereas FIG. 2 illustrates a tool path 222 that passes through (e.g., hits) an obstruction 210D. As a result, it would be expected that the straight path 222 of FIG. 2 would cause an issue during the material processing sequence.

Once the desired robotic tool path has been determined, it can be selected by the system and the intended material processing operation can be performed. For example, a cutting or welding operation (e.g., a plasma processing operation), a waterjet cutting operation, or a laser processing operation can be performed to form a part from the workpiece.

Several methods and analysis techniques are discussed herein. Unless otherwise stated, the various methods can be implemented individually or in combination with one another. As such, details or example embodiments described with respect to different figures or methods can relevant and part of the other methods and figures described herein.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A computer-implemented method for determining a preferred robotic path configuration for performing a robotic processing operation along a workpiece, the method comprising:
    providing a two-dimensional representation of a plurality of possible three-dimensional robotic tool paths to be performed to move a tool connected to a robotic tool handling system along the workpiece along a processing path, the two-dimensional representation identifying, based on robotic system data and/or workpiece data, one or more obstacles associated with the robotic tool paths;
    based on the identified obstacles, generating a set of channels about the set of obstacles to indicate feasible homotopic tool paths that avoid the obstacles;
    based on the channels, determining one or more acceptable robotic path configurations for performing a robotic processing operation along the processing path on the workpiece; and
    selecting one of the determined one or more acceptable robotic path configurations for performing the robotic processing operation in order to form a part from the workpiece.

2. The method of claim 1, wherein the channels comprise one or more adjacent separate regions of the two-dimensional representation.

3. The method of claim 2, wherein the regions comprise columns arranged side-by-side between a first point index and a last point index.

4. The method of claim 2, wherein each separate region is formed along incremental distances between the start point and end point that are substantially consistent for each channel.

5. The method of claim 2, wherein the first point index comprises a start point and the last point index comprises an end point.

6. The method of claim 2, wherein a number of regions in the set of regions corresponds to a number of obstacles identified.

7. The method of claim 2, wherein the separate regions are formed around identified obstacles.

8. The method of claim 7, wherein, for a given channel, regions are bound along upper and/or lower ends by obstacles.

9. The method of claim 2, wherein the determining one or more acceptable robotic path configurations comprises analyzing each region to determine an acceptable path through each channel and linking the determined acceptable paths through each adjacent region to form an acceptable robotic path configuration.

10. The method of claim 9, wherein the linking comprises forming a path through midpoints of each region.

11. The method of claim 9, further comprising, for each of the one or more acceptable robotic path configurations, calculating a distance between midpoints of adjacent regions.

12. The method of claim 11 further comprising selecting one of the one or more acceptable robotic path configurations to be used to perform the robotic processing operation along the workpiece based on an accumulated calculated distance between midpoints of adjacent regions for each path.

13. The method of claim 12, wherein the selection is based on the path having the least accumulated distance.

14. The method of claim 9 further comprising selecting one of the one or more acceptable robotic path configurations to be used to perform the robotic processing operation along the workpiece based on performance parameters of a component of the robotic tool handling system.

15. The method of claim 14, wherein the performance parameters comprise limitations on or more robotic joints.

16. The method of claim 1, wherein the determining one or more acceptable robotic path configurations comprises receiving one or more user-selected points along the two-dimensional representation and forming a robotic path configuration that passes through the user-selected points by analyzing each remaining region to determine an acceptable path through each region and linking the determined acceptable paths through each adjacent region.

17. The method of claim 1, wherein the determining one or more acceptable robotic path configurations comprises presenting the two-dimensional representation to a user and receiving a user's instructions for a desired robotic path configuration.

18. A computer-implemented method for determining a robotic tool path for a manufacturing processing system in three dimensional space, the method comprising:
    receiving robotic system data associated with physical parameters of a robotic tool handling system;

receiving workpiece data for a workpiece to be processed by the material processing system, the workpiece data relating to a processing path of a tool connected to the robotic tool handling system along the workpiece during a material processing operation;

based on the robotic system data, calculating a plurality of potential robotic tool paths configured to move the tool along the processing path;

identifying obstacles along the robotic tool paths;

presenting to a user a two-dimensional representation of the potential robotic tool paths as a function of a predetermined robotic parameter to be adjusted during the operation;

based on the identified obstacles, determining feasible robotic tool paths between the start point and the end point that avoid the obstacles; and selecting one of the determined feasible robotic tool paths for the material processing operation in order to form a part from the workpiece.

19. The method of claim 18, wherein the calculating a plurality of potential robotic tool paths comprises evaluating, at a series of points along the processing path, a possible range of motion and orientation of the robotic tool handling system to place the tool in an intended position at each of the series of points.

20. The method of claim 19, wherein the evaluating a possible range of motion and orientation comprises determining changes in motion and orientation of the robotic tool handling system based on a range of values of the predetermined robotic parameter.

21. The method of claim 20, wherein the predetermined robotic parameter comprises an angular position of the tool about its longitudinal axis.

22. The method of claim 19, wherein the presenting to the user the two-dimensional representation comprises presenting a series of adjacent columns, each column corresponding to each of the series of points along the processing path.

23. The method of claim 22, wherein the identifying the obstacles along the robotic tool paths comprises determining values of the predetermined robotic parameter at which, based on the robotic system data, the robotic tool handling system is not suitable to provide the tool to the intended position at each of the series of points.

24. The method of claim 23 further comprising providing a visual indication along each column in regions of the two-dimensional representation at which the robotic tool handling system is not suitable to provide the tool to the intended position.

* * * * *